US 11,247,884 B2

United States Patent
Bristow et al.

(10) Patent No.: US 11,247,884 B2
(45) Date of Patent: Feb. 15, 2022

(54) VEHICLE MOUNTED FORK LIFT AND METHOD

(71) Applicant: Mobilift LLC, Lubbock, TX (US)

(72) Inventors: Michael W. Bristow, Keytesville, MO (US); Jeffrey D. Marsh, Foristell, MO (US)

(73) Assignee: Mobilift LLC, Lubbock, TX (US)

( * ) Notice: Subject to any disclaimer, the term of this patent is extended or adjusted under 35 U.S.C. 154(b) by 0 days.

(21) Appl. No.: 16/509,696

(22) Filed: Jul. 12, 2019

(65) Prior Publication Data

US 2019/0337783 A1 Nov. 7, 2019

Related U.S. Application Data

(62) Division of application No. 15/198,720, filed on Jun. 30, 2016, now Pat. No. 10,370,231.

(Continued)

(51) Int. Cl.
*B66F 9/08* (2006.01)
*B60P 1/44* (2006.01)
*B66F 9/065* (2006.01)

(52) U.S. Cl.
CPC .............. *B66F 9/082* (2013.01); *B60P 1/44* (2013.01); *B66F 9/065* (2013.01)

(58) Field of Classification Search
CPC ..... B60P 1/4407; B60P 1/4414; B60P 1/4421; B60P 1/4442; B60P 1/445; B60P 1/4485; B60P 1/4492; B66F 9/082

(Continued)

(56) References Cited

U.S. PATENT DOCUMENTS 1,929,112 A * 10/1933 Hansen .................. B60P 1/4414
414/557
2,469,321 A * 5/1949 Wood ..................... B60P 1/4414
414/557

(Continued)

FOREIGN PATENT DOCUMENTS

| CN | 2277980 | 8/1998 | |
| DE | 29502286 U1 * | 4/1995 | ............... B66F 9/02 |
| DE | 19938727 A1 * | 3/2001 | ............ B60P 1/4442 |

OTHER PUBLICATIONS

Machine Translation of DE 19938727 A1.*

(Continued)

*Primary Examiner* — Saul Rodriguez
*Assistant Examiner* — Brendan P Tighe
(74) *Attorney, Agent, or Firm* — Klemchuk LLP

(57) ABSTRACT

A fork lift apparatus is mounted on a truck for picking up a load, placing the load in a traveling position on the truck, and for unloading the load. The apparatus comprises a lift frame, a shaft, a pair of spaced arms secured to the shaft, a cross member spanning between the distal ends of the arms distal and carrying the forks. The cross member is rotatable relative to the support arms. A pair of drive hydraulic cylinders rotates the shaft and thus moves the arms and the load between a loading/unloading position in which the load may be placed on the forks and the traveling position so that the load may be transported by the truck. A self-leveling system is provided for maintaining the load in a substantially level position as it moves between its loading/unloading and traveling positions.

5 Claims, 28 Drawing Sheets

Related U.S. Application Data

(60) Provisional application No. 62/187,644, filed on Jul. 1, 2015, provisional application No. 62/348,398, filed on Jun. 10, 2016.

(58) Field of Classification Search
USPC .............. 414/546, 547, 551, 556, 557, 558
See application file for complete search history.

(56) References Cited

U.S. PATENT DOCUMENTS

| | | | |
|---|---|---|---|
| 2,527,818 A | | 10/1950 | Ives |
| 2,683,539 A | * | 7/1954 | Corley, Jr. ............ B60P 1/4414 414/557 |
| 2,719,637 A | * | 10/1955 | Wood ................... B60P 1/4414 414/557 |
| 2,832,487 A | * | 4/1958 | Oster ...................... B66F 9/195 414/661 |
| 3,737,055 A | * | 6/1973 | Pettit ...................... B60P 1/445 414/558 |
| 3,830,384 A | | 8/1974 | Barber |
| 4,076,310 A | | 2/1978 | Schwalm |
| 4,078,676 A | | 3/1978 | Mortenson |
| 4,124,099 A | * | 11/1978 | Dudynskyj ........... B60P 1/4414 280/166 |
| 4,381,166 A | | 4/1983 | Smart |
| 4,583,907 A | | 4/1986 | Wimberley |
| 4,729,712 A | | 3/1988 | Corley, Jr. |
| 5,641,261 A | * | 6/1997 | Talbert ................ B66F 9/07559 187/226 |
| 6,799,945 B2 | | 10/2004 | Chalet et al. |
| 6,881,023 B1 | | 4/2005 | Sullivan |
| 7,717,662 B2 | | 5/2010 | Alexander |
| 8,192,130 B2 | | 6/2012 | Clark |
| 8,221,048 B2 | | 7/2012 | Grollitsch |
| 8,322,968 B1 | | 12/2012 | Mizner |
| 8,534,981 B1 | | 9/2013 | Bortz |
| 8,973,898 B2 | | 3/2015 | Hurd |
| 8,974,169 B2 | | 3/2015 | Mizner |
| 10,370,231 B2 | | 8/2019 | Bristow et al. |
| 2001/0014272 A1 | | 8/2001 | Ochoa et al. |
| 2018/0043814 A1 | * | 2/2018 | Presby ................. B60P 1/4414 |

OTHER PUBLICATIONS

Machine Translation of DE 29502286 U1.*
Examination Report No. 1 for standard patent application corresponding to Australian foreign International Application No. 2016288669 dated Dec. 20, 2019.
International Search Report corresponding to International Application No. PCT/US2016/40417 dated Nov. 17, 2016.
International Written Opinion corresponding to International Application No. PCT/US2016/40417 dated Nov. 17, 2016.

* cited by examiner

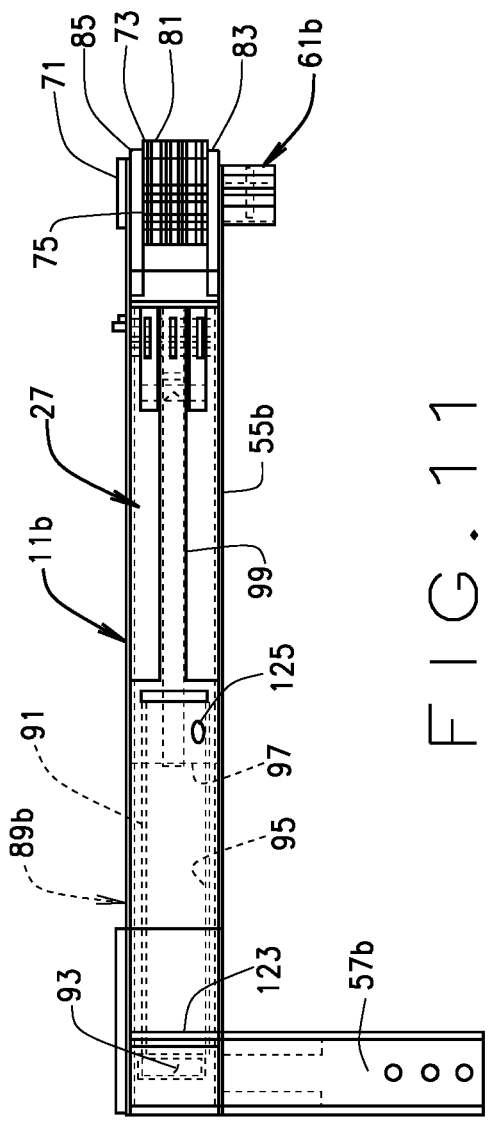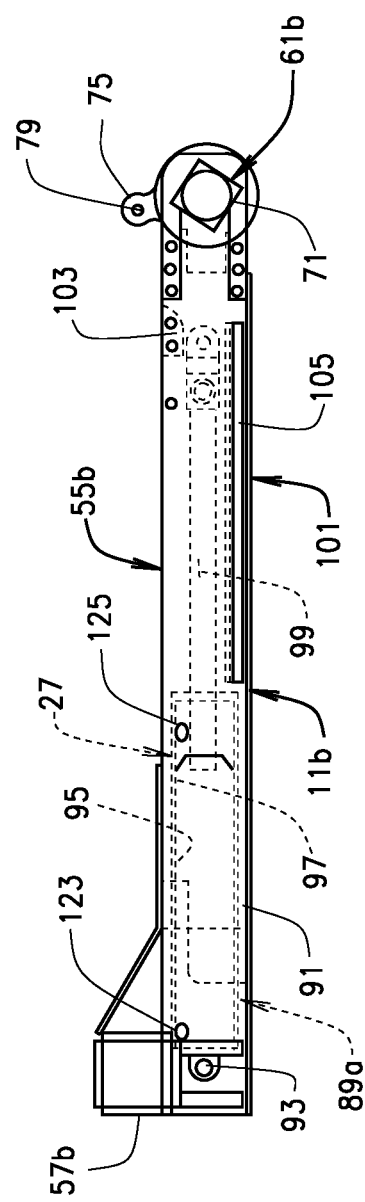

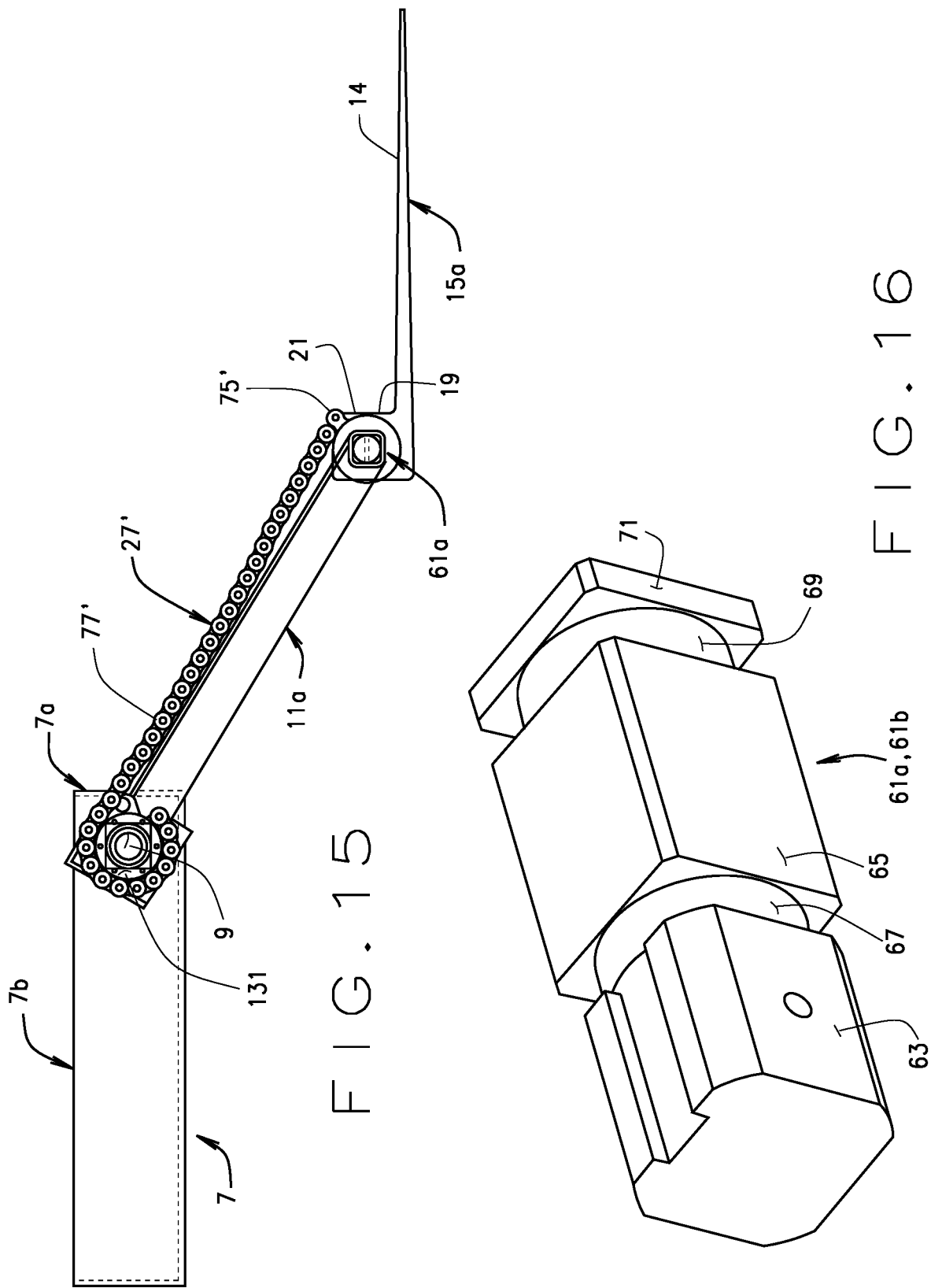

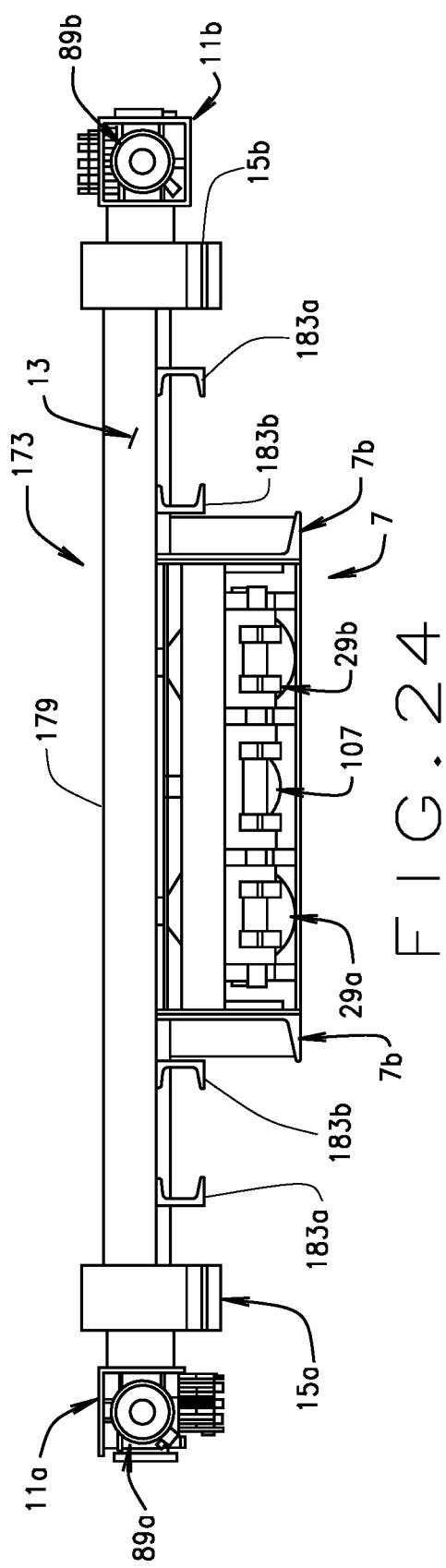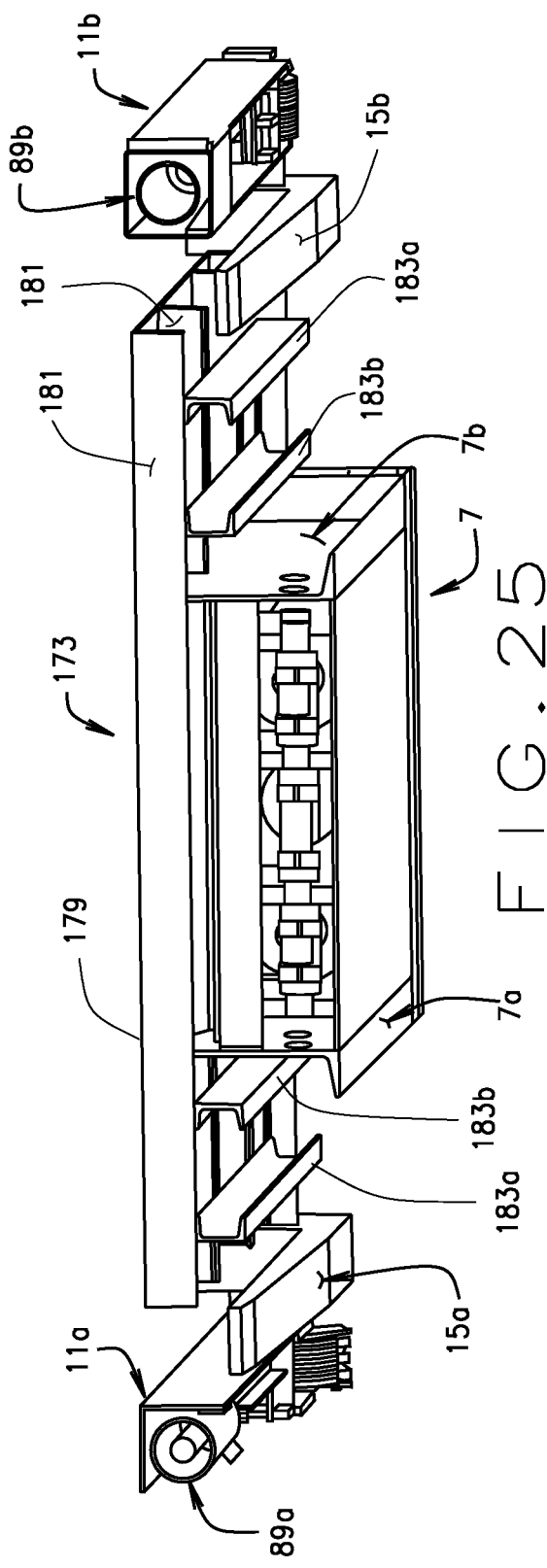

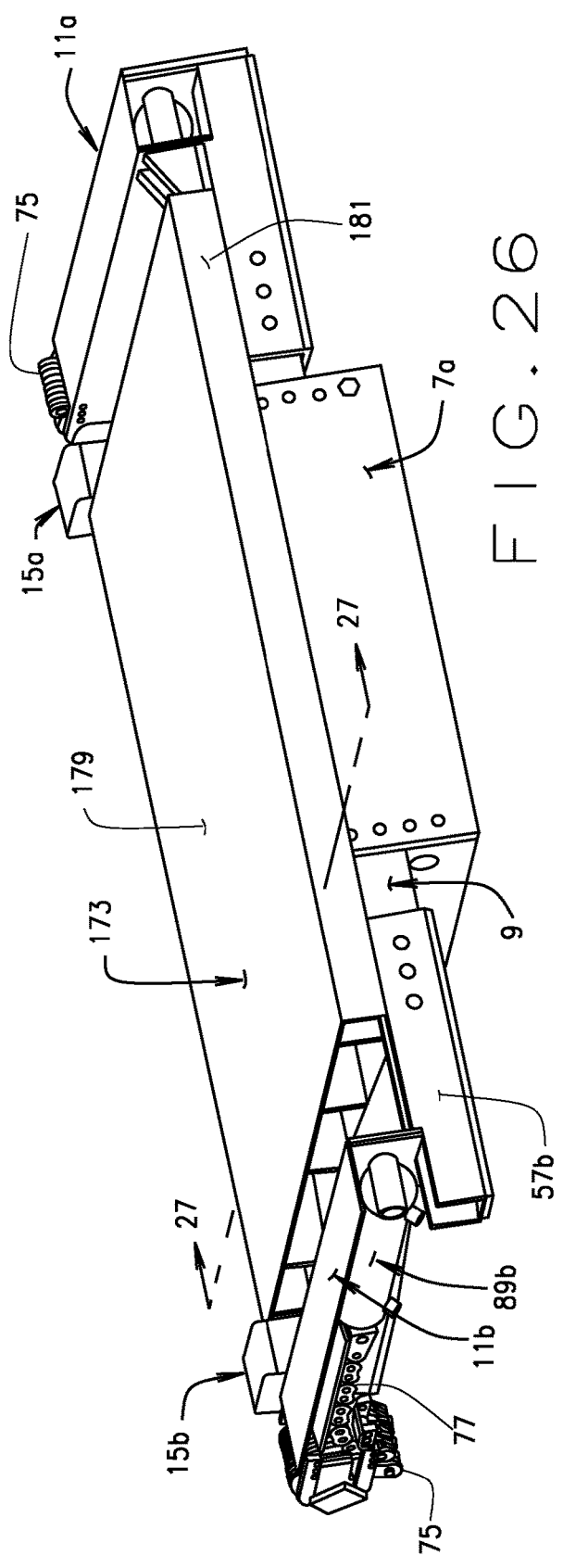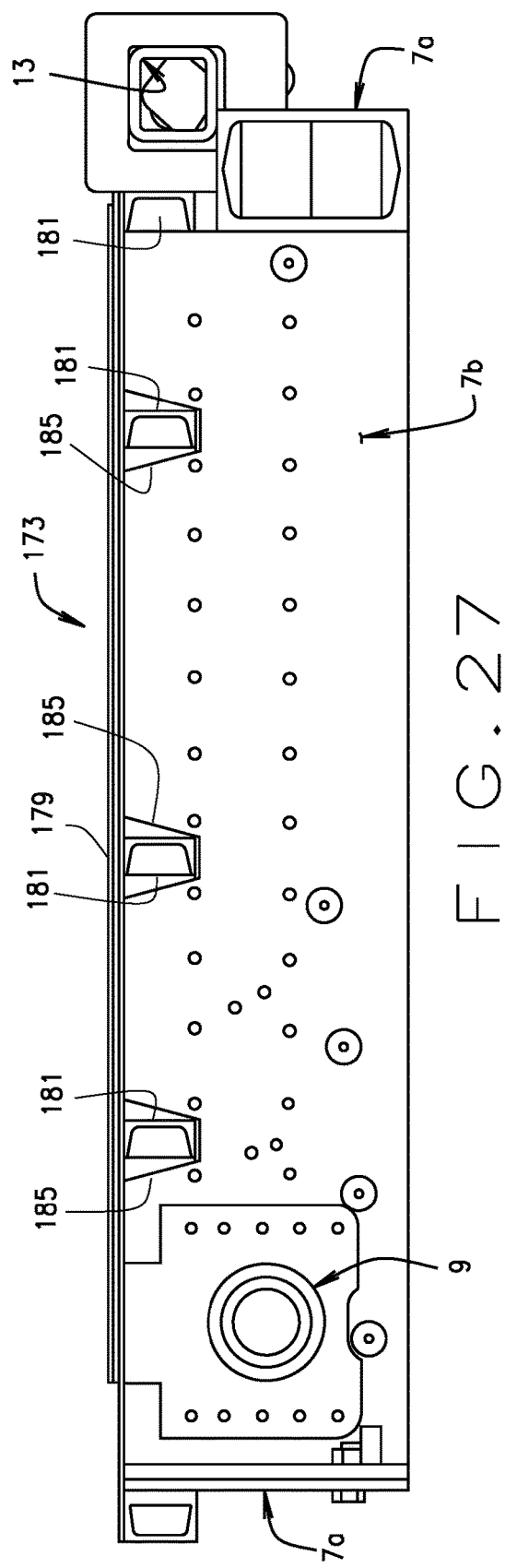

VEHICLE MOUNTED FORK LIFT AND METHOD

CROSS-REFERENCE TO RELATED APPLICATIONS

The present application is a division of co-pending U.S. patent application Ser. No. 15/198,720 filed on Jun. 30, 2016, which is related to, and claims priority from U.S. Provisional Application No. 62/187,644, filed on Jul. 1, 2015, and to U.S. Provisional Application No. 62/348,398, filed on Jun. 10, 2016, which are herein incorporated by reference in their entirety.

STATEMENT REGARDING FEDERALLY SPONSORED RESEARCH OR DEVELOPMENT

Not Applicable.

BACKGROUND OF THE DISCLOSURE

This disclosure relates to a vehicle or truck mounted fork lift apparatus capable of lifting a load from the ground and moving the load to a traveling position on the vehicle so that the load may be transported to a desired location and then unloaded from the vehicle.

On farms and construction sites, for example, it is often necessary to move heavy loads (e.g., a pallet load of feed bags or of roofing shingles) and a fork lift is not available to load the load or unload the load onto a vehicle for transport of the load from one site to another. Further, farmers and contractors often do not have a truck that they can dedicate to hauling such loads, but rather most have a truck that they could so use if truck did not have to be dedicated to hauling such loads, but rather could be used as a pickup or a flatbed truck when not being used to haul such loads.

Reference may be made to U.S. Pat. Nos. 4,583,907, 6,799,935, 7,717,662, 8,192,130, 8,221,048, 8,322,968, 8,534,981, 8,973,898, and 8,974,169 that describe various forklift and lift devices that can be attached to or used with a truck, such as a pickup or flatbed truck, to lift a heavy load and in some instances to transport that load on the bed of the truck and to unload the load in another location.

SUMMARY OF THE DISCLOSURE

Among the various objects and features of the lift of the present disclosure may be noted the provision of a lift that may be installed on the frame of a pickup truck that will enable the truck to pick up a heavy load (up to about 4,500 pounds, or about 2045 kg.), such as a pallet load of roofing shingles or other products, which may be resting on the ground, to lift the load, and to deposit the load on the bed of the truck in a traveling position, so that the truck may transport the load to another site and to off load the load onto the ground.

Another object of the lift of the present disclosure is a lift, which when not in use, allows the owner of the truck to use the truck as a flatbed truck.

Another object of the lift of the present disclosure is a lift that maintains the load in a level position as it is lifted from the ground and deposited on the bed of the truck and as the load is unloaded back onto the ground.

Still another object of the lift of the present disclosure is a lift that may be readily installed on the frames of trucks of different manufacturers without undue modification of the lift or of the truck.

Another object of the lift of the present disclosure is a lift that has a relatively simple hydraulic system for operating the lift and does not require a complicated computer control system.

Still further, the lift of the present disclosure securely latches the load to the lift frame when the load is in a traveling position so that the load will be maintained in place on the lift when the truck is driven to another location.

Another object of the lift of the present disclosure is that with the load supported on the lift in its traveling position, the weight of the load is supported by the lift frame and not by the lifting forks.

Still further, with the load latched to the lift frame in its traveling position, the load may be readily unlatched from the lift frame by moving the lift forks inwardly and then raised to lift the load from its traveling position and to deposit the load on the ground in its loading/unloading position.

Other objects and features of the present disclosure will be in part apparent to those skilled in the art and will be in part particularly pointed out hereinafter.

Load lifting apparatus of the present disclosure is adapted to be mounted on a truck or other vehicle for picking up a load from a loading/unloading position, for placing the load in a traveling position on the truck, and for unloading the load. The apparatus comprises a lift frame configured to be mounted on the truck, a shaft journalled with respect to the lift frame, a pair of spaced arms secured to and rotatable with the shaft, a cross member spanning between the arms distal from the connection of the arms to the shaft, and at least one load lifting member supported from the cross member. The cross member and the load lifting member carried by the cross member is rotatable with respect to the support arms. A drive is provided for rotating the shaft between a first shaft position in which the load lifting member is in its loading/unloading position such that with the lift frame mounted on the truck, the load lifting member is in a substantially horizontal position at ground level so that the load may be positioned on the load lifting member and a second shaft position in which the load lifting member and the load carried thereby are in the traveling position. The drive is operable in reverse direction for rotating the shaft from the second shaft position to the first shaft position so as to move the load lifting member and the load from the traveling position to the loading/unloading position so that the load may be unloaded from the load lifting member. Means is provided for maintaining the load lifting member and the load carried thereby in a substantially level position as the load moves between the loading/unloading and traveling positions.

In the loading apparatus, as described above, the drive comprises at least one hydraulic drive cylinder having a drive cylinder body having a bore, a drive piston within the bore of the drive cylinder body, and a drive rod connected to the drive piston and extending from the drive cylinder body. One end of the drive cylinder body is connected to the lift frame and the distal end of the drive rod is connected to a lug extending radially from the shaft via a flexible member. With the load lifting member in its the loading/unloading position and with the load disposed on the load lifting member, the drive cylinder is actuable to extend the drive rod from the drive cylinder body to thereby effect rotation of the shaft from the first shaft position toward the second shaft position, which in turn effects movement of the load lifting member and the load from the loading/unloading position toward the travelling position. With the load carrying member and the load disposed in its the traveling position, the drive cylinder is actuable to retract the drive rod into the drive cylinder body thereby to effect rotation of the shaft from the second shaft position toward the first shaft position, which in turn effects movement of the load carrying member and the load from the traveling position toward the loading/unloading position.

Loading apparatus, as described in the above two paragraphs, wherein the means for maintaining the lifting member and the load in a substantially level position as the load is moved between the loading/unloading and hauling positions comprises a lug extending radially from the cross member and a slave hydraulic cylinder mounted on one of the support arms. The slave cylinder has a slave cylinder body having a bore therein with the slave cylinder body being connected to the support arm. A slave piston is sealably slidable within the bore of the slave cylinder, and a slave rod is coupled to the slave piston and extends from the slave cylinder toward the outer end of its respective the arm. The self-leveling means further includes a master cylinder having a master cylinder body connected to the lift frame. The master cylinder body has a bore, a master piston sealably slidable within the bore of the master cylinder body and a master rod coupled to the master piston and extending from the master cylinder. The master rod is connected to the flexible member coupling the drive rod of the drive cylinder to the lug on the shaft. The drive cylinder and the master cylinder are hydraulically connected to one another so that as the drive cylinder is actuated to rotate the shaft, the master rod moves with the rod of the drive cylinder. The slave cylinder is hydraulically connected to the master cylinder so that as the master rod is extended or retracted the slave cylinder rod is extended or retracted with the master cylinder rod. The slave rod is connected to the cross member lug via a flexible leveling member (e.g., a chain) such that upon actuation of the drive cylinder to move the arms and the load from the loading/unloading position toward the traveling position, the load exerts torque on the cross member that tends to rotate the forks downwardly such that the cross member lug exerts a tension force on the slave cylinder rod via the flexible leveling member that tends to draw the slave cylinder rod out of the slave cylinder, but where hydraulic pressure in the rod end of the slave cylinder and in the base end of the master cylinder prevents movement of the slave piston and the slave rod until pressure within the drive cylinder effects rotation of the shaft in which case hydraulic fluid from the rod end of the slave cylinder flows to the base end of the master cylinder thus permitting extension of the rod of the slave cylinder and of the master cylinder so as to enable the cross member to rotate relative to the arms and so as to maintain the lifting member and the load in the substantially level position as the lifting member and the load are moved between the loading/unloading and traveling positions.

A method is disclosed for lifting a load from a loading/unloading position in which the load is supported on the ground, for transferring the load to a traveling position on a vehicle, and for unloading the load. The method employs a lift having a lift frame configured to be secured to the frame of the vehicle, a pair of side arms, a cross member carried by the distal ends of the side arms, a pair of forks carried by the cross member, and a drive for moving the side arms and the load carried by the forks between the loading/unloading and traveling positions. The method comprises, with the forks in the loading/unloading position, supporting a load on the forks. The drive is actuated to move the load from the loading/unloading position toward the traveling position, wherein with the load in the traveling position the load is horizontally displaced from the loading/unloading position. The load is maintained in a substantially level position as the load is moved between its loading/unloading and traveling positions. With the load in its traveling position, substantially all of the weight of the load is transferred from the forks to the lift frame. Then, latching the load to the lift frame when the load is in its traveling position.

BRIEF DESCRIPTION OF THE DRAWINGS

Referring now to the drawings.

FIG. 11 is a top plan view of the left-hand support arm shown in FIG. 10 with portions broken away to illustrate certain components of one embodiment of a self-leveling means for maintaining the load substantially level as the load is moved between its loading/unloading and traveling positions;

FIG. 12 is a side elevational view of the support arm shown in FIG. 11;

FIG. 15 is a side elevational view of FIG. 14 showing the other embodiment of the self-leveling means and the forks in their loading/unloading position;

FIG. 16 is a perspective view of an adapter/bearing member secured to an outer end of the cross member for journaling the cross member with respect to the support arms so that the cross member and the load supported thereby may rotate with respect to the support arms so that the load may be maintained in a substantially level position as the apparatus moves the load between its loading/unloading and traveling position;

FIG. 24 is a vertical cross sectional view taken along line 24-24 of FIG. 1 illustrating a bed platform removably installed on the upper reaches of the lift frame for supporting the load when the load is in its traveling position;

FIG. 25 is a perspective bottom view of FIG. 24;

FIG. 26 is a perspective front view of the lift in its traveling position with the bed platform overlying and connected to the lift frame for supporting the load;

FIG. 27 is a cross-sectional view of the lift frame taken along line 27-27 of FIG. 26 on a somewhat larger scale and rotated 180° with the bed platform secured to the top of the lift frame;

Corresponding reference characters represent corresponding parts of the present disclosure throughout the several views of the drawings.

DESCRIPTION OF PREFERRED EMBODIMENTS

Figure 1:
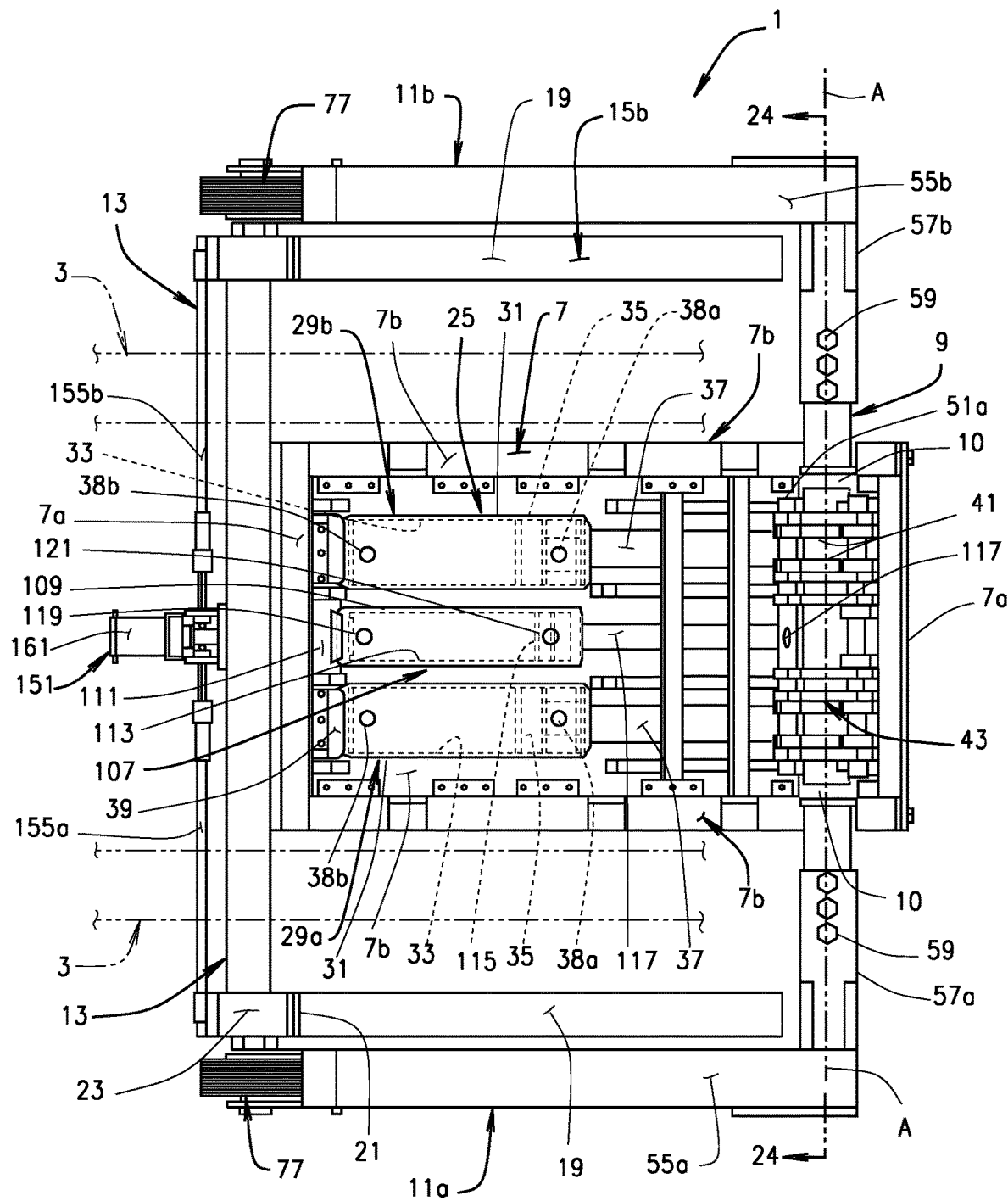
FIG. 1 is a top plan view of the lifting apparatus of the present disclosure adapted to be mounted on a truck (or other vehicle) for lifting a load from a loading/unloading position on the ground (as shown in FIGS. 2 and 3) to a traveling position (as shown in FIGS. 1 and 4) on the truck in which the load is supported generally above the lifting apparatus and then is off-loaded onto the ground, with the frame of the truck being shown in phantom.
Figure 2:
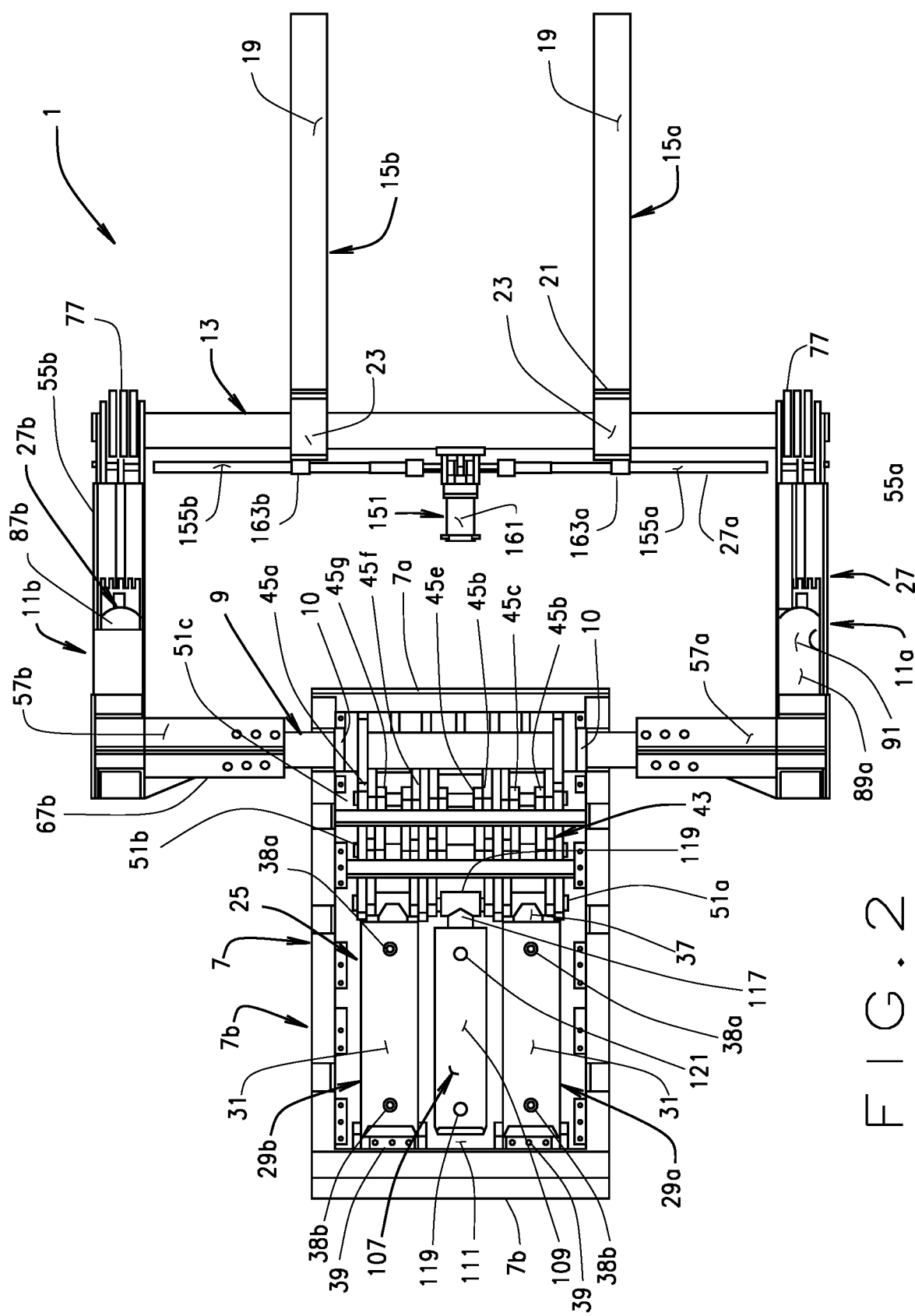
FIG. 2 is a top plan view of the lifting apparatus of FIG. 1 in its loading/unloading position.
Figure 3:
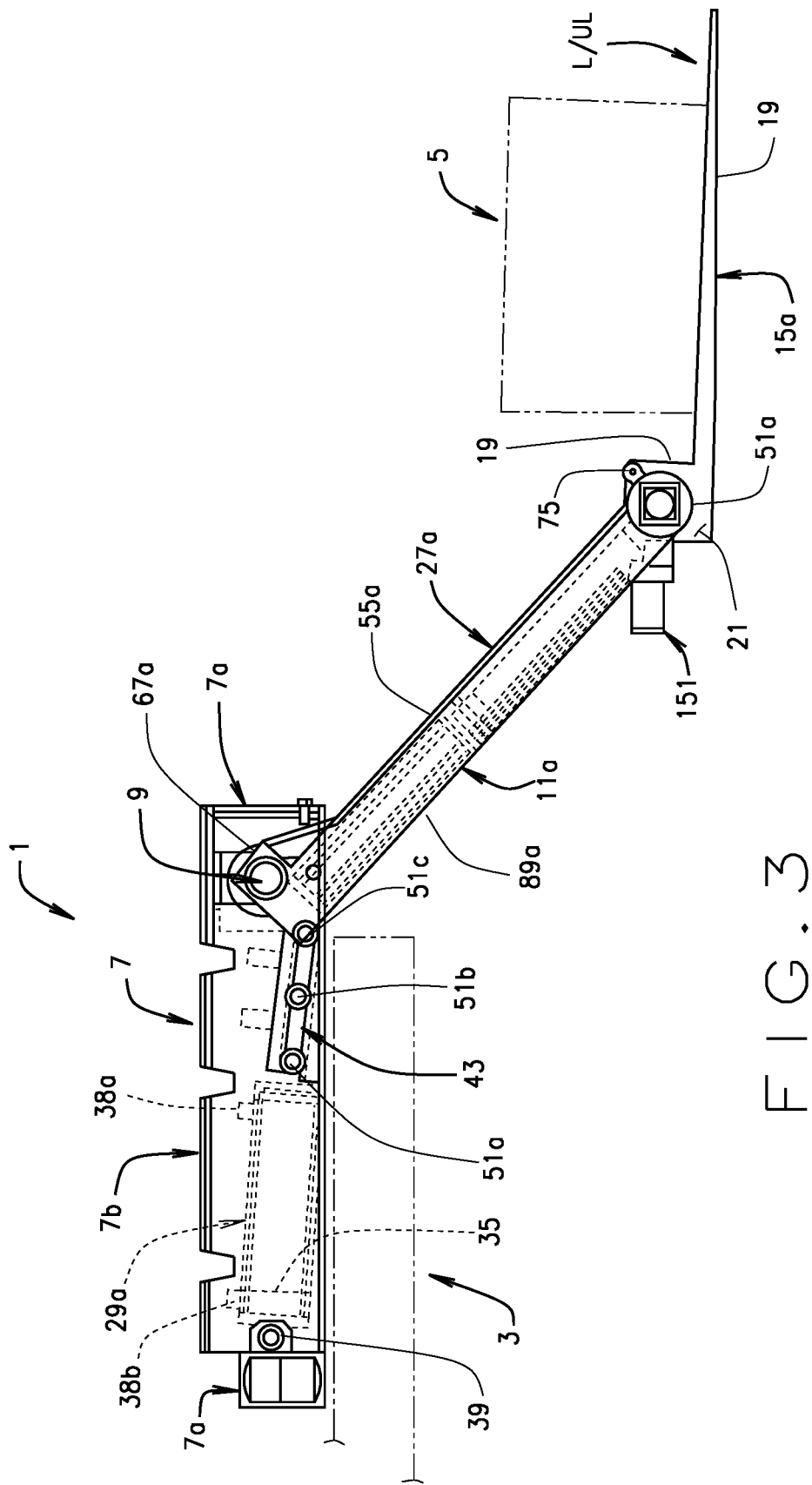
FIG. 3 is a side elevational view of the apparatus in its loading/unloading position, as it may be mounted on the frame of a truck or the like, with a load (as shown in phantom) supported on a lifting member or on the forks of the lifting apparatus.
Figure 4:
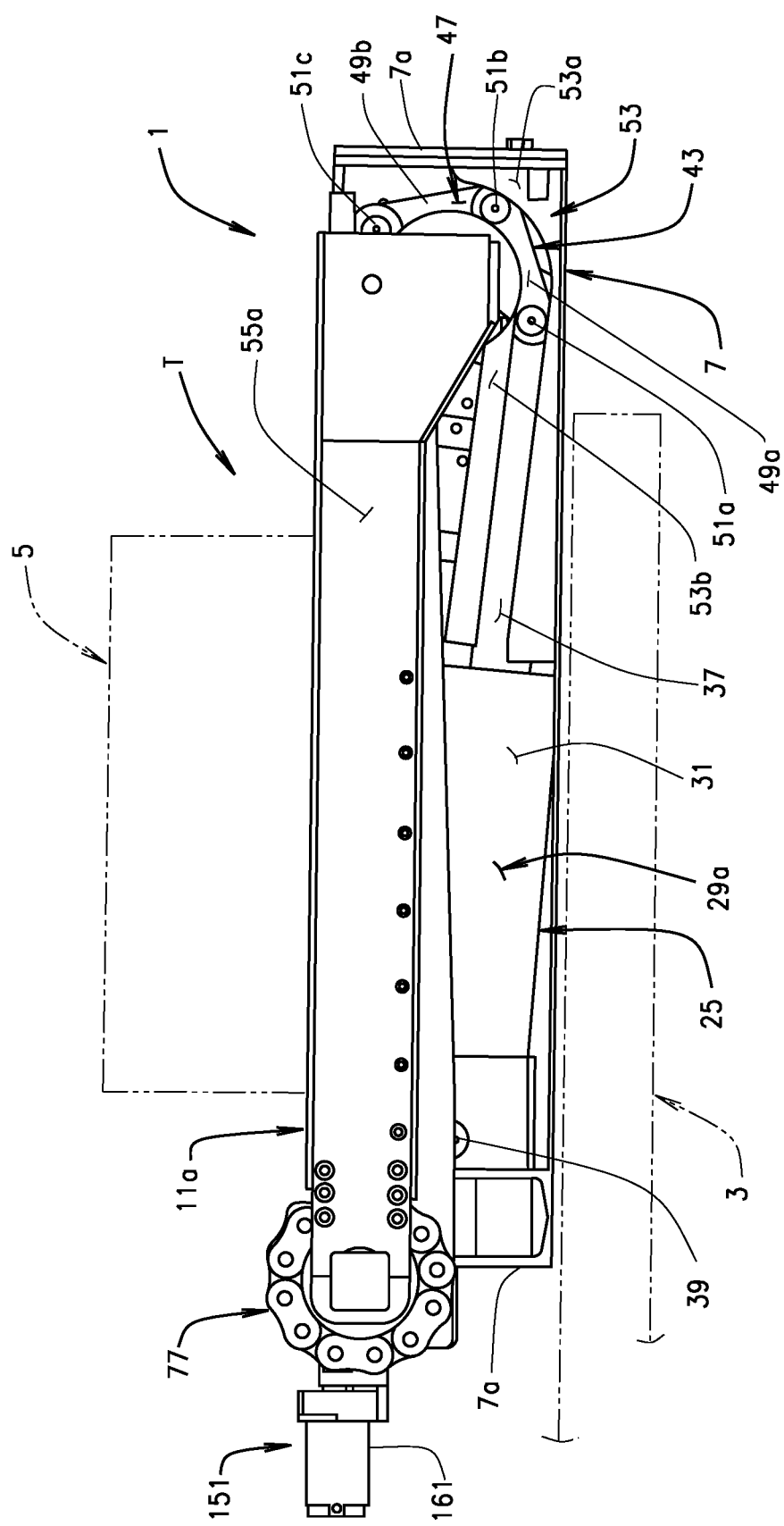
FIG. 4 is a side elevational view of the lifting apparatus in its traveling position.

Referring now to the drawings, and more particularly to FIGS. 1-5, a lifting apparatus, as generally indicated by reference character 1, is shown in its entirety. The apparatus is adapted to be mounted on a vehicle, such as a truck, and more particularly is adapted to be mounted to the frame 3 (as shown in phantom in FIGS. 1, 3 and 4) of the vehicle, to lift a load 5 from a loading/unloading position L/UL (as best shown in FIG. 3) and to stow the load on the lifting apparatus in a traveling position T (as best shown in FIG. 4). It will be particularly noted that with the load in its traveling position, it is horizontally displaced from its loading/unloading position. When the load is transported by the vehicle to a desired off-loading location, the apparatus 1 may be operated to lift the load from its traveling position T and to re-deposit the load on the ground in its loading/unloading position L/UL. In the preferred embodiments of the present disclosure, it is preferred that the apparatus 1 be mounted directly on the frame of the truck, but it may be mounted on top of a flat bed or within the bed of a pickup truck, which in turn is secured to the frame 3 of the truck. Preferably, with the load in its loading/unloading position, the load is located on the ground to the rear of the vehicle, and with the load in its traveling position, the load is supported on the frame 3 of the vehicle, preferably over or forward of the rear axle of the vehicle.

Figure 5:
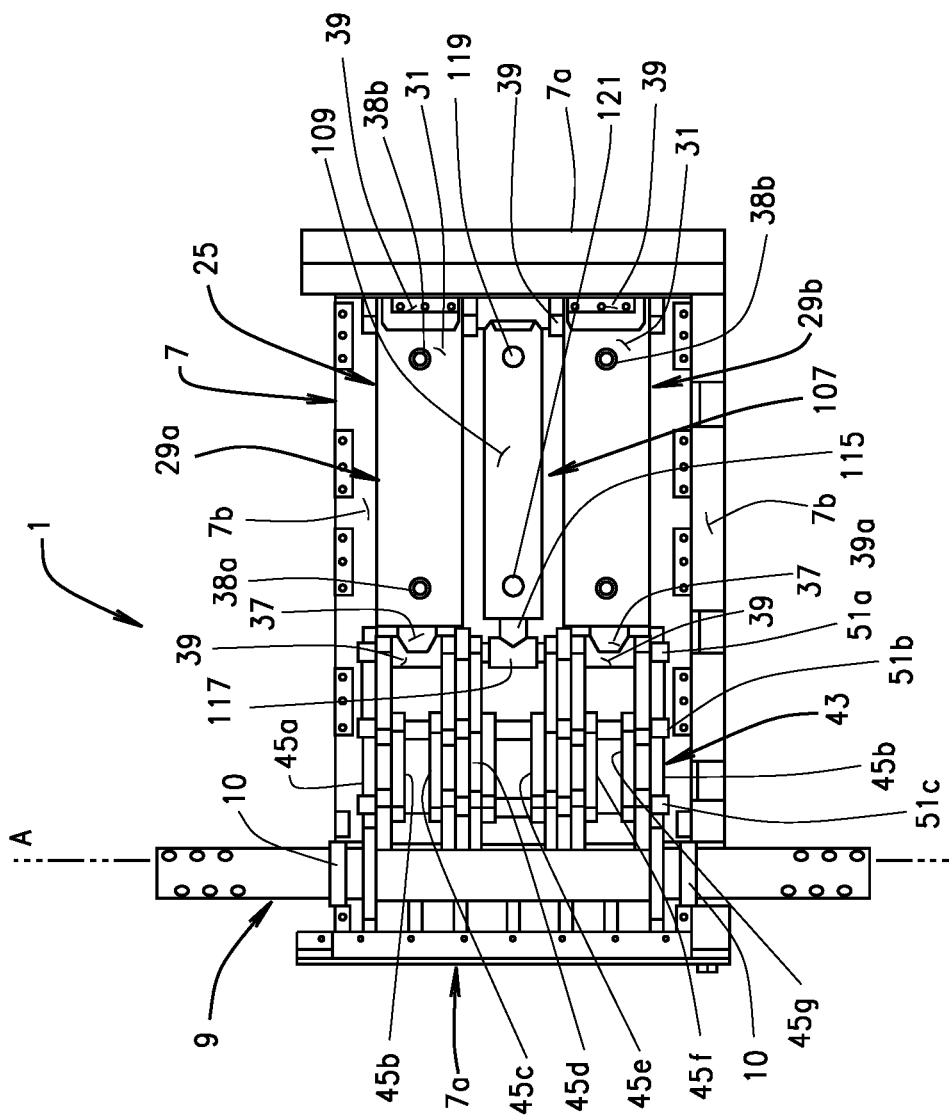
FIG. 5 is a top plan view of the lifting apparatus on a somewhat smaller scale rotated 180° from its position shown in FIG. 1, with certain components removed so as to better illustrate portions a drive for moving the lifting members (or forks) and the load between its loading/unloading and traveling positions.
Figure 7:
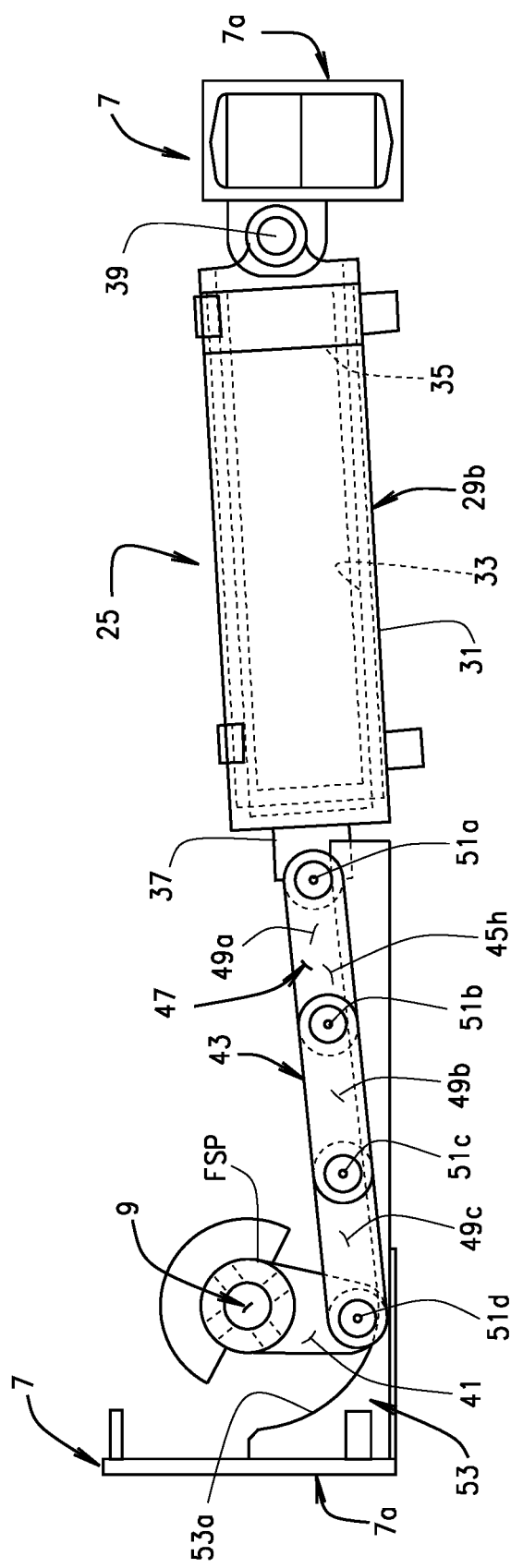
FIG. 7 is a side elevational view of FIG. 6 illustrating the drive cylinder in position to move the load from its loading/unloading position toward its traveling position upon actuation of the drive cylinders to extend their respective drive rods.
Figure 9:
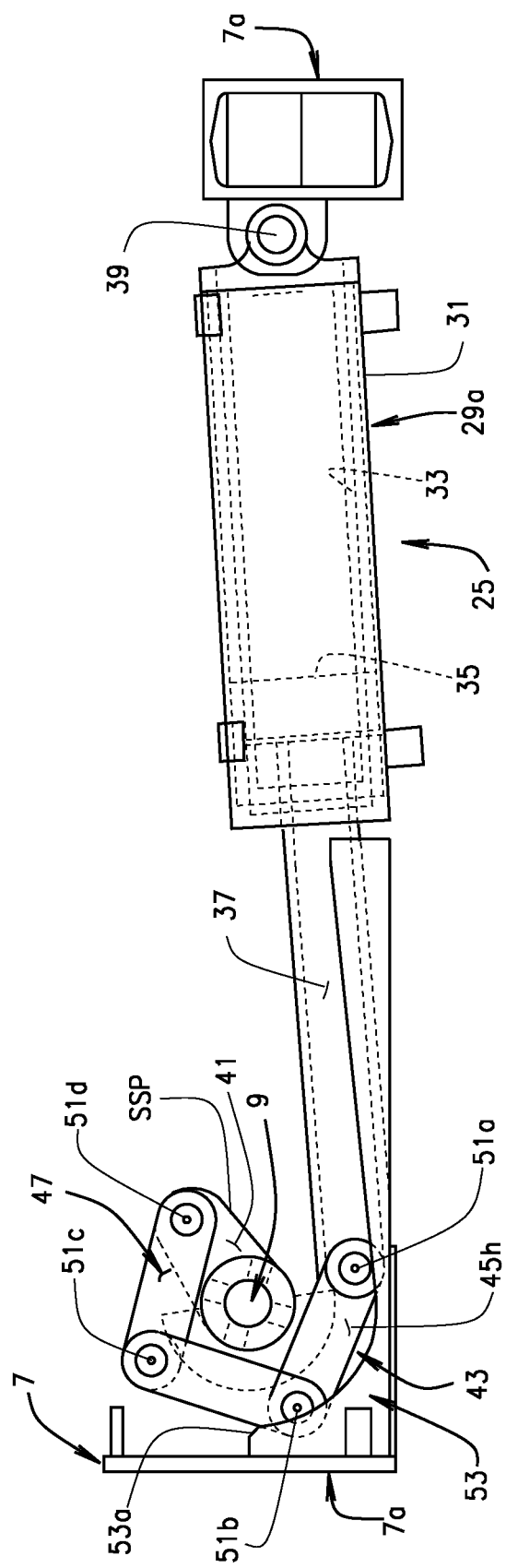
FIG. 9 is a side elevational view of FIG. 8.

Apparatus 1 has an apparatus frame, as generally indicated at 7, that is adapted to be secured to the truck frame 3 in any suitable manner. Frame 7 is generally rectangular and it has traverse frame members 7a at each end of the frame and longitudinal frame members 7b spanning between the transverse members. A shaft 9 is journalled to the frame 7 by suitable bearings 10 (as best shown in FIGS. 1, 2 and 5) so that the shaft is rotatable about a horizontal axis A-A (as shown in FIG. 1) that is substantially perpendicular to the longitudinal frame members 7b. Shaft 9 is rotatable between a first shaft position FSP, as best shown in FIG. 7, in which the load 5 is in its loading/unloading L/UL, and a second shaft position SSP, as best shown in FIG. 9, in which the load L is in its traveling position T. The shaft 9 rotates through a shaft angle of about 240°, plus or minus about 30°, as the load is moved between its loading/unloading and traveling positions.

A support arm 11a or 11b is each rigidly affixed to a respective outer end of shaft 9 such that each of the arms rotates with the shaft about horizontal axis A-A. A cross member 13, preferably a square tube, is mounted to and spans between the distal ends of the support arms 11a and 11b. At least one, and preferably a pair of lifting members 15a, 15b (e.g., a pair of lifting forks), is carried by the cross member 13 for supporting the load 5 as the load is lifted and moved between the loading/unloading and traveling positions. Preferably, each lifting fork 15a, 15b has a horizontal portion 19 and a vertical portion 21 where the horizontal portion is rigidly cantilevered from the vertical portion. However, within the scope of this disclosure, instead of lifting forks, the lifting member may be a one-piece flat platform for supporting the load L. Each lifting fork further has a slidable connection 23 (as shown in FIGS. 1 and 2) on the upper end of vertical fork portion 21 for connection of the fork to cross member 13 in such manner as to enable the lifting fork to be moved (slid) along the cross member. The cross member 13 is preferably a rigid, square tube and the fork slidable connection 23 is constituted by a generally square opening in the vertical fork portion 21 which is adapted to receive the square cross member 13 with a relatively close fit so as to prevent any substantial downward movement of the forks relative to the cross member as the forks lift the load 5, but yet permits the ready sliding of the forks on the cross member when the load is not supported on the forks so that the forks may be positioned to best support the load.

Figure 13:
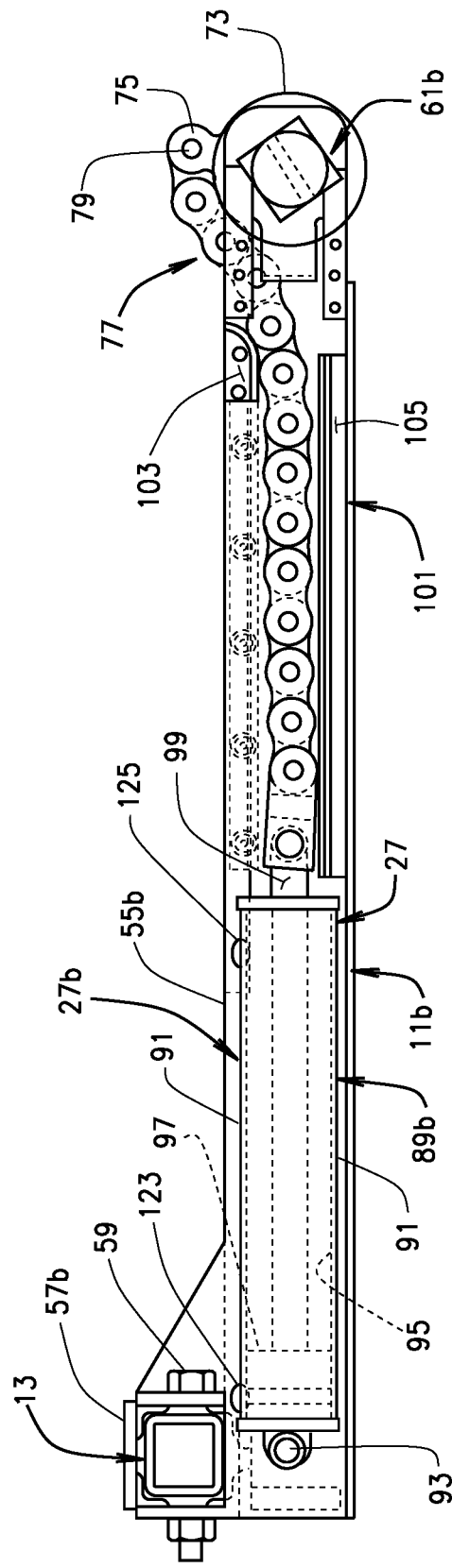
FIG. 13 is a side elevational view of the support arm shown in FIG. 11, but on a somewhat larger scale and with some portions of the side arm broken away to illustrate components of a first embodiment of the self-leveling means.
Figure 14:
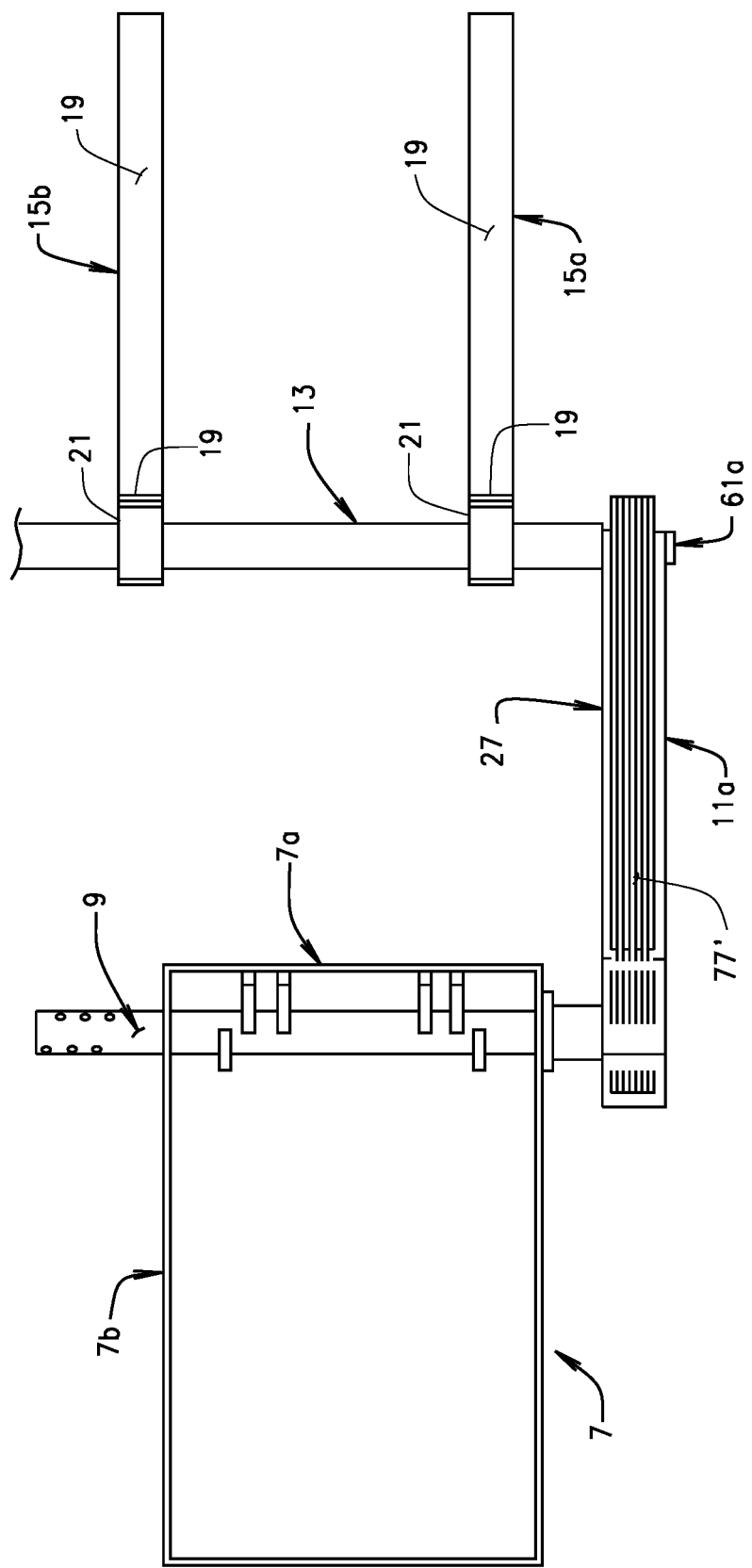
FIG. 14 is a partial top plan view of the lifting apparatus illustrating another embodiment of means for self-leveling the load as the load is moved between its loading/unloading and traveling positions.

As generally indicated at 25, a drive is provided for rotating shaft 9 between the first shaft position FSP and the second shaft position SSP so as to effect movement of the support arms 11a and 11b and the load 5 carried by the lifting members or forks 15a, 15b between the loading/unloading position L/UL and the traveling position T. As generally indicated at 27 (as best shown in FIGS. 11-13) and 27' (as shown in FIGS. 14 and 15), means is provided, preferably within each support arm 11a, 11b, for self-leveling the forks 15a, 15b and the load 5 carried thereby as the load is moved between its loading/unloading and traveling positions. This self-leveling means will be described in detail hereinafter.

Figure 8:
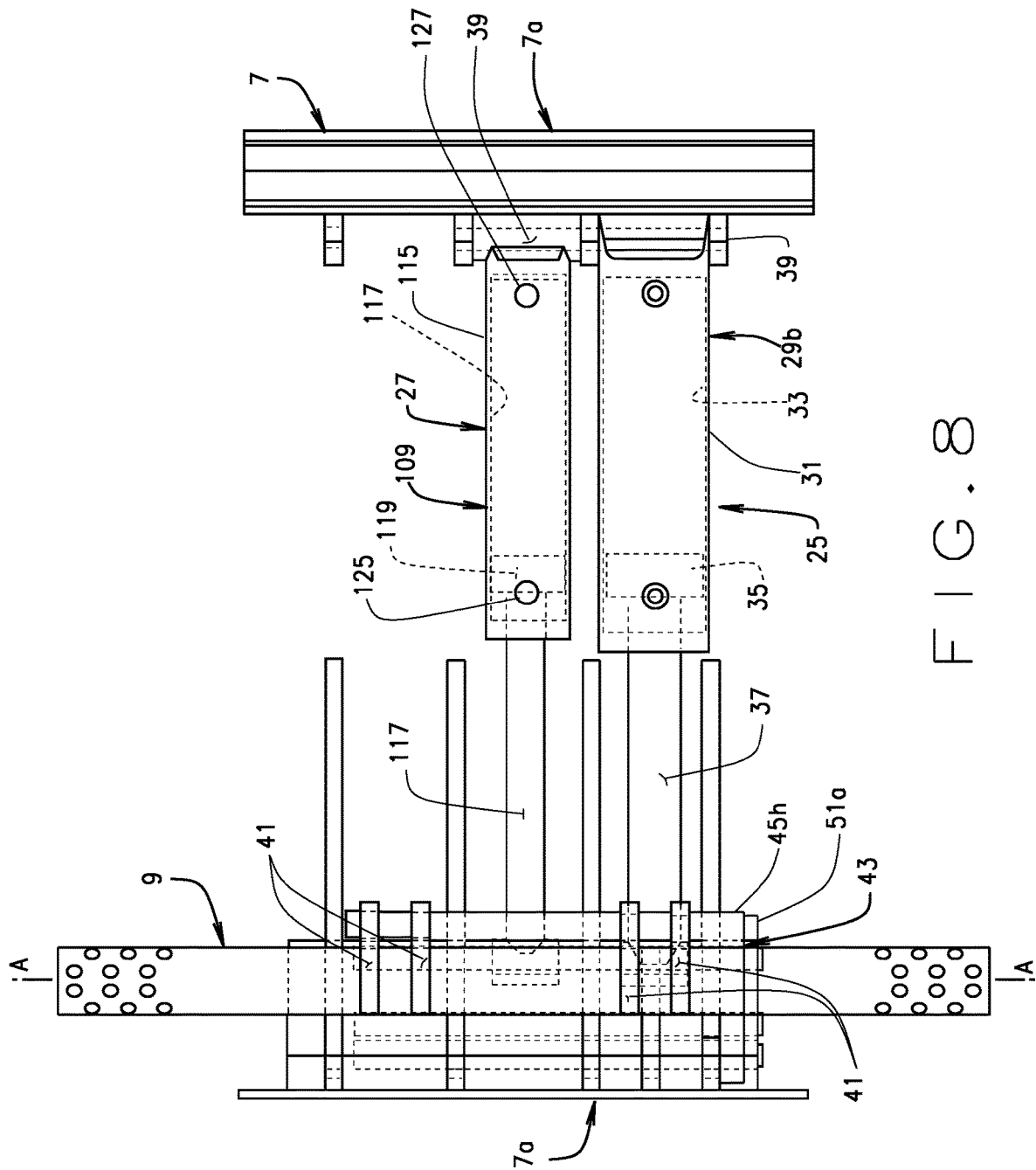
FIG. 8 is a partial top plan view similar to FIG. 6, but with the drive rods of the drive cylinders in their extended position such that upon actuation of the drive cylinders to retract their drive rods, the load will move from its traveling position toward its loading/unloading position.
Figure 35:
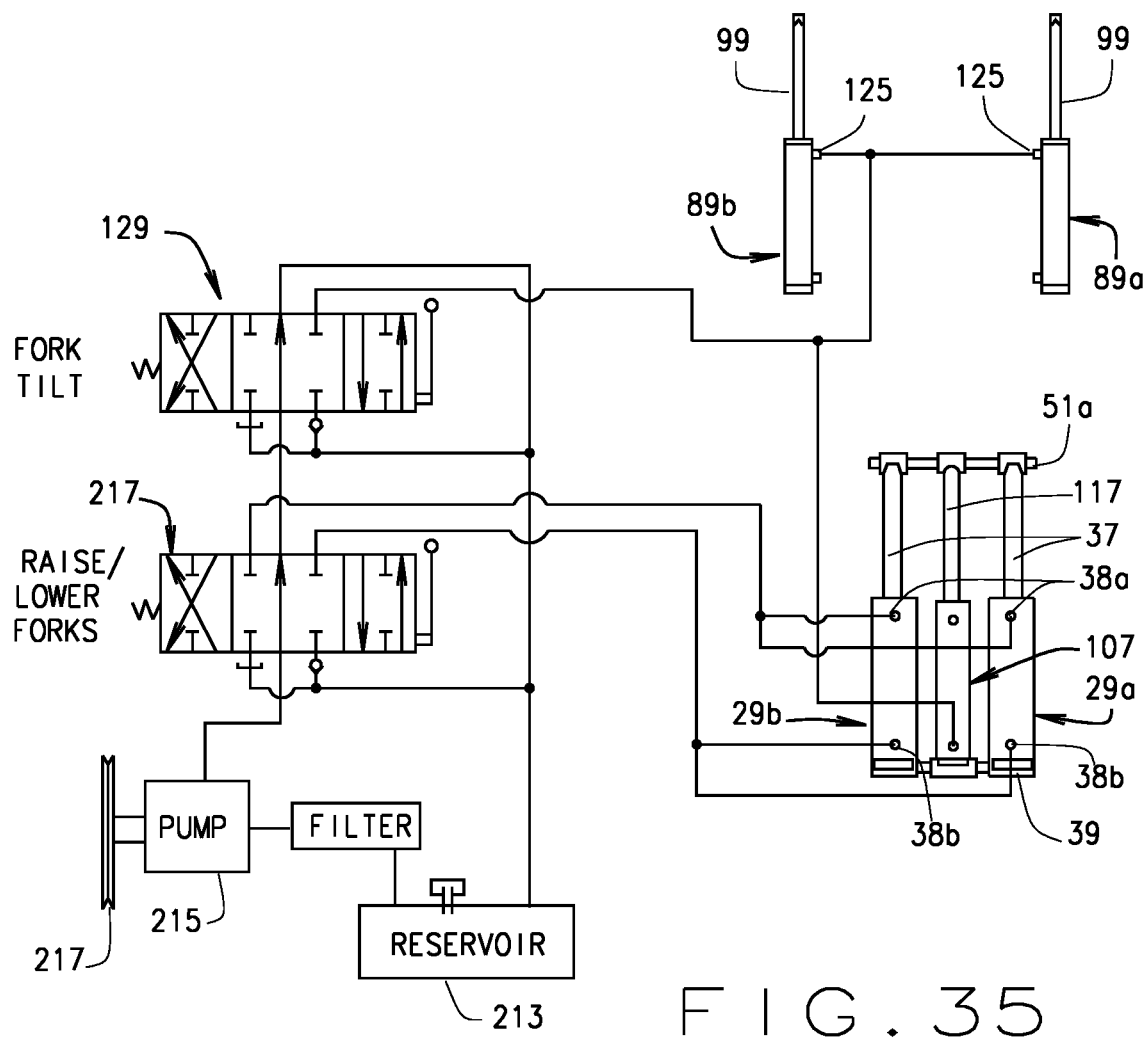
FIG. 35 is a diagrammatic view of a hydraulic system, including a hydraulic pump preferably powered by the engine of the truck on which the lift is mounted for supplying hydraulic fluid under pressure to the drive cylinders, for moving the lift between its loading/unloading and traveling positions and for manually varying the tilt of the forks by selectively supplying hydraulic fluid to the hydraulic embodiment of the self-leveling system, as shown in FIGS. 10-13, 20A and 20B, as required.

Referring now to FIGS. 1-3 and 5-9, drive 25 includes a pair of hydraulic drive cylinders 29a, 29b (as shown in FIGS. 1 and 2). Each of these drive cylinders has a respective cylinder body 31 having a drive cylinder bore 33 therein. A drive piston 35 is sealably slidable within its respective drive cylinder bore 33, and a drive rod 37 extends from the distal end its respective drive cylinder body 31 and is movable with its respective drive piston 35. Each drive cylinder body has a rod end port 38a and a base end port 38b connected to a supply of pressurized hydraulic fluid, as shown in FIG. 35, such as provided by a hydraulic pump 215 for extending and retracting drive rods 37 for purposes as will appear. Each drive cylinder body 31 is, as indicated at 39, pin connected to the adjacent transverse frame member 7a. The end of drive rod 37 is pin connected to a respective crank lug 41 (as best shown in FIGS. 7-9) secured to shaft 9 by an elongate flexible member, such as a multi-strand chain, as generally indicated at 43. More specifically, a plurality of spaced lugs 41 is rigidly attached (e.g., welded) to shaft 9, with each of these lugs extending radially from shaft 9. The multi-strand chain 43 is constrained by a chain guide (as will be described in detail hereinafter) so that it is capable of applying both tension and compression loads to lugs 41. More specifically, chain 43 comprises a plurality of side-by-side chain segments or strands 45a-45h, as best shown in FIG. 5. Each chain strand has a plurality of links (preferably two or more links), as generally indicated at 47, pinned together in end-to-end fashion to form the chain strands. More specifically, each chain strand 45a-45h comprises a first link 49a having its proximate end pin connected to the distal ends of drive rods 37 by an elongate pin 51a, one or more intermediate links (also referred to as second links), as indicated at 49b, pin connected to the distal end of its respective first link 49a of each chain strand by an elongate pin 51b. Each chain strand segment further includes a last (e.g., the third as shown in FIGS. 7 and 9) link 49c, where the distal end of links 49b are pin connected to the proximal ends of links 49c by an elongate pin 51c. The distal end of each link 49c is pin connected to a respective lug 41, as indicated at 51d. However, it will be understood that each chain strand may include more than three links. Because the ends of drive rods 37 are connected by a common pin 51a and because of the way the drive cylinders are hydraulically connected to one another (as shown in FIG. 35), the drive rods are extended and retracted in unison.

Because chain 43 is flexible, a guide, as generally indicated at 53 and is best illustrated in FIGS. 4, 7 and 9, is provided for constraining the chain as the drive cylinders 29a, 29b are actuated to extend drive rods 37 so that a compression load may be applied to the lugs 41 on shaft 9 to effect rotation of the shaft and the load forks 15a, 15b from their loading/unloading position L/UL to their traveling position T. Specifically, as shown in FIG. 4, guide 53 comprises a lower, curved guide 53a and an upper guide 53b that are spaced apart from one another to allow chain 43 to move therebetween as the drive cylinders 29a, 29b are actuated to extend their respective drive rods 37 so as push the chains to rotate shaft 9 from position FSP (shown in FIG. 7) toward the second shaft position SSP (shown in FIG. 9)

thereby to effect movement of the lift from its loading/ unloading position to its traveling position. The guide 53 constrains the chain so that the cylinders may transmit a compression load to the shaft 9 as the drive rods are extended. As drive cylinders 29a, 29b are actuated to retract rods 37, the multi-strand chain 43 is pulled to effect rotation of shaft 9 in the opposite direction to effect movement of the lift from its traveling position to its loading/unloading position.

Referring now to FIGS. 10-18, a more detailed description of the support arms 11a, 11b, cross member 13, the attachment of the cross member 13 to the distal ends of support arms 11a, 11b, and the means 27 for self-leveling the lifting forks 15a, 15b and load L will be disclosed. As indicated 57a, 57b, an adapter is rigidly affixed to and extends inwardly from the proximal end of each support arm 11a, 11b to receive a respective outer end of shaft 9. A plurality of bolts 59 (as shown in FIG. 1) secures the adapters 57a, 57b to the outer ends of shaft 9 so that the support arms rotate with the shaft 9 as the support arms are moved between the loading/unloading and traveling positions.

As generally indicated at 61a, 61b, an adapter/bearing member is provided between the outer ends of cross member 13 and the adjacent distal end of its respective support arms 11a or 11b to permit the cross member to rotate with respect to the support arms as the support arms and the load 5 are moved between their loading/unloading positions and traveling in order for the self-leveling means 27 to maintain the forks 15a, 15b and the load 5 in a substantially level position. Cross member 13 is preferably a square tube so that it may slidably receive the connection portions 23 of forks 15a, 15b so as to allow the forks to be slid laterally along the cross member to best support the load on the forks, but the square cross section of the cross member and the square openings in the connector portions 23 of forks 15a, 15b prevents the forks from rotating downwardly as the load is lifted. Of course, the weight of the load on the forks generates a torque or twisting moment on the cross member and the self-leveling means 27 (which will be described in detail hereinafter) resist this torque and maintains the loading forks and the load in a substantially level position.

Figure 17:
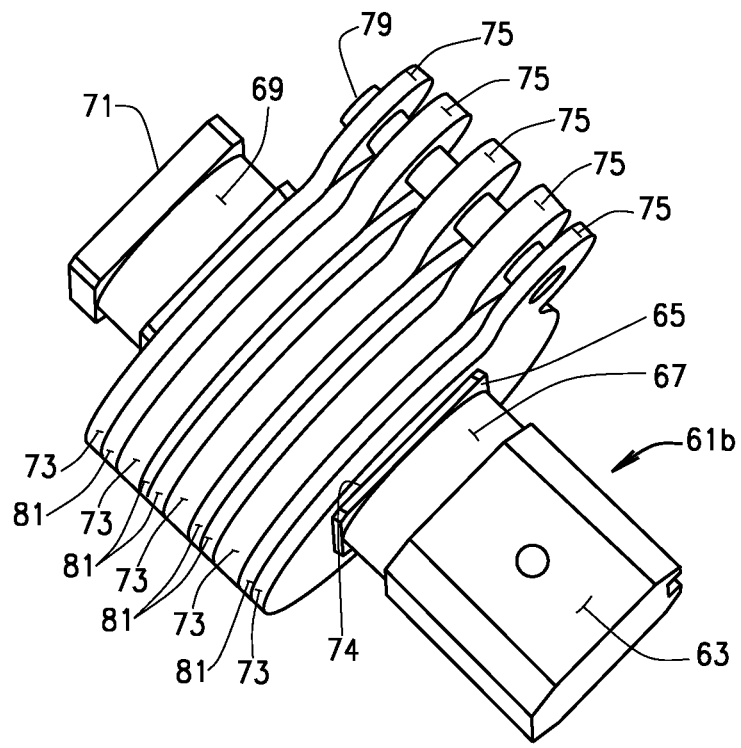
FIG. 17 is a perspective view of the adapter/bearing member shown in FIG. 16 having a chain connector mounted on the adapter/bearing member for connecting a flexible, multi-strand leveling chain to the adapter/bearing member for resisting rotation of the cross member relative to the support arms under the weight of the load supported on the forks so as to maintain the forks and the load carried thereby in a substantially level position as the forks and the load are moved between their loading/unloading and traveling positions.
Figure 18:
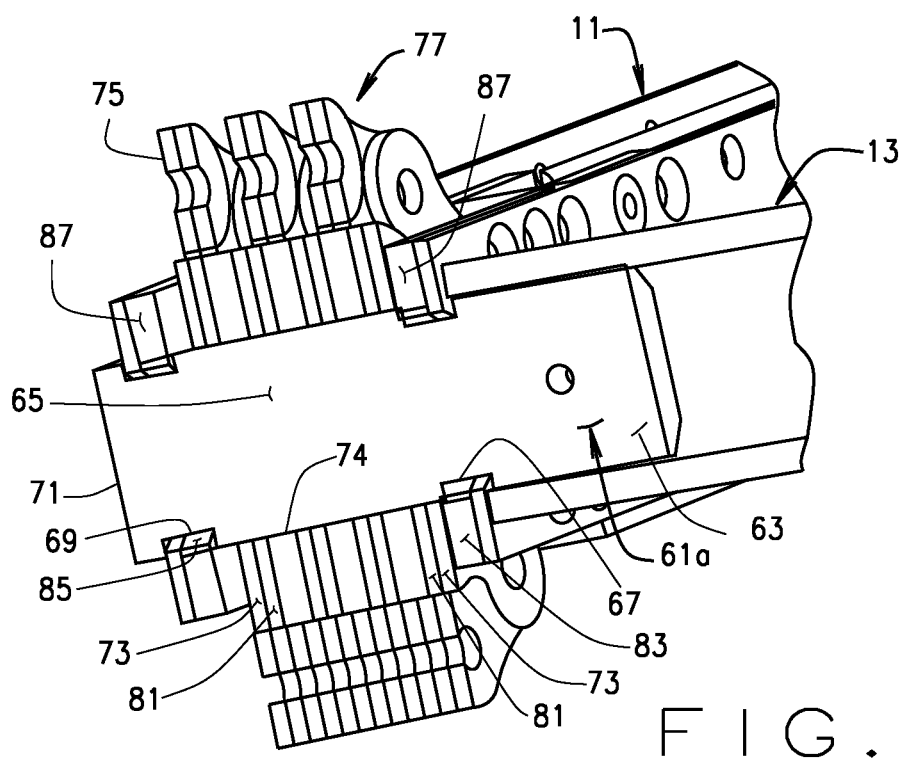
FIG. 18 is a longitudinal cross-sectional perspective view of the adapter bearing member shown in FIG. 17 as it is received in one end of the cross member and as it is connected to the distal end of one of the side arms illustrating inner and outer bearings for journaling the cross member relative to the support arms and further illustrating self-leveling chain connector affixed against rotation relative to the adapter bearing member and connected to the multi-strand leveling chain.

As best shown in FIGS. 16-18, each adapter/bearing member 61a, 61b comprises an adapter section 63 of generally square cross section sized to fit within the outer end of cross member 13 and to be pinned or bolted to the cross member by a bolt or the like (not shown). Outboard of the adapter section 63 is a generally square cross section chain connecting portion, as indicated at 65, for purposes as will appear. Between the adapter section 63 and the chain connection portion 65 is an inner bearing race 67. An outer bearing race 69 is outboard of the outer end of the chain connection portion 63, and an end cap 71 is at the outer end of the adapter 43.

As shown in FIGS. 17 and 18, a plurality of chain connector members 73 each having a square-shaped central opening 74, is received on the chain connection portion 65 of each adapter/bearing 61a, 61b such that the chain connector members 73 will not rotate with respect to its respective adapter/bearing member. Each chain connector member 73 has a respective chain connection lug 75 that extends radially from the generally circular outer periphery of the chain connector members. An elongate flexible member or chain, as best indicated at 77 in FIG. 13, is connected to lugs 75 by means of an elongate pin 79. Spacers 81 are placed between the chain connector members 73 so that the lugs 75 match the spacing of the chain 77 to be connected to the lugs 75 by pin 79.

As best shown in FIG. 18, an inner bearing 83 is placed on inner race 67 of each adapter 61a, 61b and an outer bearing 85 is placed on outer race 69. Removable bearing caps 87 that are secured to the outer ends of arms 11a, 11b hold the bearings 83 and 85 in place on their respective bearing races. End cap 71 holds the bearings and chain connector members in place on the adapter when the adapter portion 63 is inserted in a respective open end of cross member 13 and pinned to the cross member, and when the bearing caps 87 are secured in place relative to the distal ends of the arms 11a, 11b. The bearings 83 and 85 journal the cross member 13 relative to the arms so that the cross member may rotate relative to the arms as the arms and the load 5 are moved between their loading/unloading and traveling positions. In this manner, the self-leveling means 27 (as will be described in detail in relation to FIGS. 20A and 20B) may maintain the load in a substantially level position as it moves between its loading/unloading and traveling positions.

Referring now to FIGS. 3 and 11-13, a first embodiment of means 27 for self-leveling the lifting forks 15a, 15b and the load 5 as the load is moved between the loading/ unloading and traveling positions will now be described. As noted, cross member 13 is journalled relative to side arms 11a, 11b by inner and outer bearings 83 and 85 to rotate about its longitudinal axis. As the forks 15a, 15b lift load 5, the weight of the load applies a torque on the cross member that tends to rotate the forks downwardly. The self-leveling means 27 resists this torque as the apparatus 1 and the load 5 is moved between the loading/unloading and traveling positions so as to maintain the forks and the load in a substantially level position.

More specifically, self-leveling means 27 comprises a pair of substantially identical self-leveling subassemblies 27a, 27b installed in each respective side arm 11a, 11b. Each of these self-leveling subassemblies comprises a slave hydraulic cylinder, as generally indicated at 89a, 89b, each of which is carried by and is preferably mounted within a respective support arm 11a or 11b. Because these slave cylinders are identical, only the slave cylinder 89b and its associated components located within support arm 11b, as shown in FIGS. 11-13, will be described in detail, but it will be understood that the other slave cylinder 89a and its associated components are of substantially identical construction and operation. Slave cylinder 89b comprises a conventional hydraulic cylinder having a cylinder body 91 pin connected to its support arm 11b, as best indicated at 93 in FIGS. 11-13. The slave cylinder body 91 has a cylinder bore 95 therein and a slave piston 97 is sealably slidable within the cylinder bore. A slave rod 99 is connected to the piston and is moveable with the piston within the cylinder bore between an extended position, as shown in FIGS. 11 and 12, and a retraced position, as shown in FIG. 13. The flexible tension member is preferably a chain 77 and is connected to the end of rod 99 and chain connector lugs 75 that are affixed to and are rotatable with cross member 13 and the respective adapter/bearing member 61b that journals the cross member to the distal end of side arm 11b. It will be understood that leveling chain 77 applies a tension load to lugs 75, which resists the downward force or torque that load 5 resting on forks 15a, 15b applies to the cross member 13 such that the forks and the load are maintained in a substantially level or horizontal position as the lift 1 and the load are moved between their loading/unloading and traveling positions. As is best shown in FIG. 13, a chain guide, as generally indicated at 101, is provided within side arm 11b for guiding the chain 77 as it extends between the end of rod 99 and the connector lugs 75. This chain guide comprises an upper and a lower chain guide member 103, 105, respectively, that are spaced to receive chain 77 and yet to permit movement of the chain between the guides.

Figure 6:
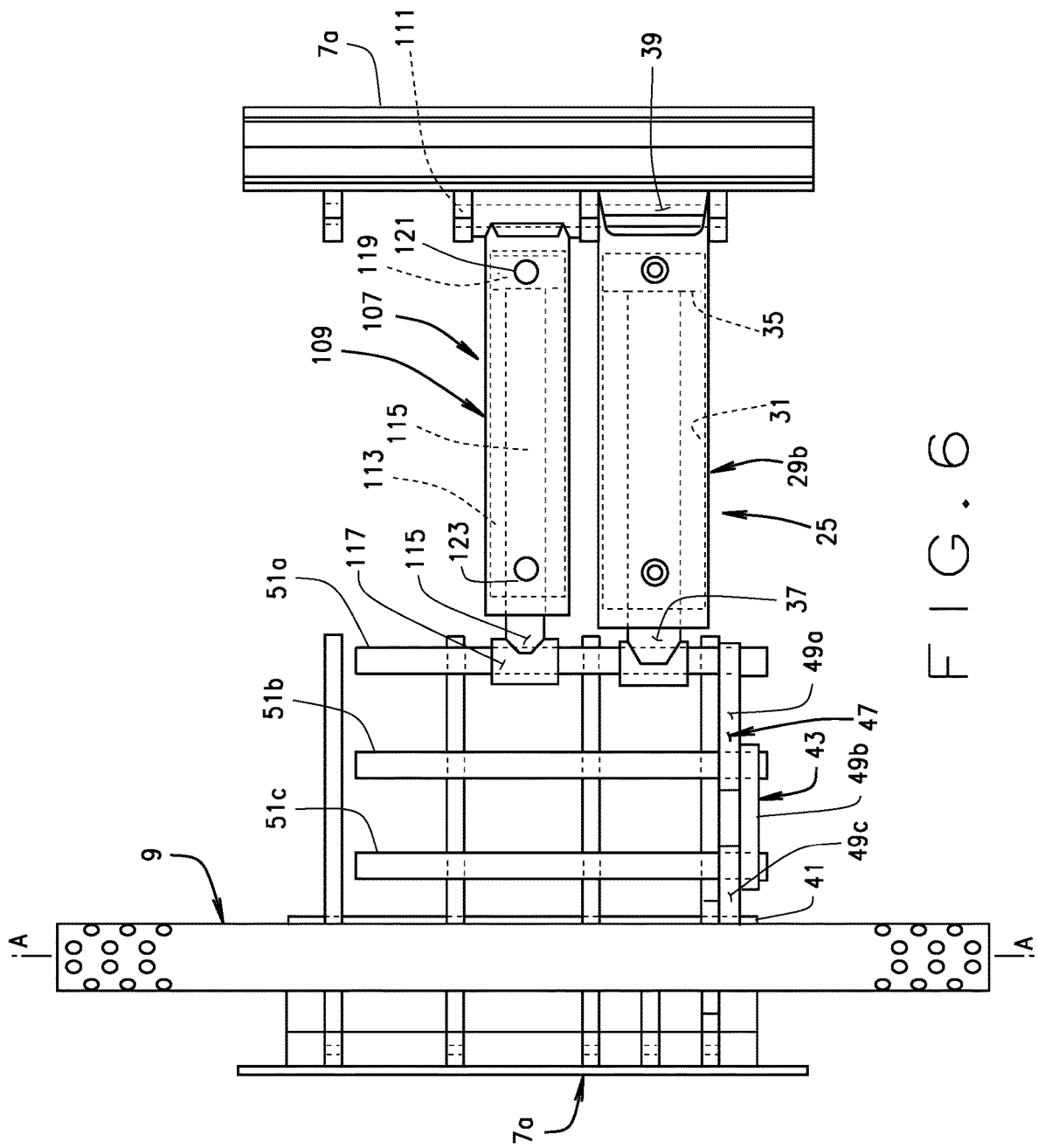
FIG. 6 is a partial top plan view of FIG. 5 on a somewhat larger scale illustrating a lifting drive having a pair of drive hydraulic cylinders (only one of which is shown in FIG. 6) in position to move the load from its loading/unloading position toward its traveling position upon actuation of the drive cylinders to extend their rods.

Means 27 further comprises a master cylinder, as generally indicated at 107, and which is best illustrated in FIGS. 1, 2, 5, 6, 8, 20A, 20B and 35. Master cylinder 107 has a master cylinder body 109 whose base end is, as indicated at 111, pin connected to transverse frame member 7a in the same manner as drive cylinders 29a, 29b. Master cylinder body 109 has a master cylinder bore 113 therein. A master piston 115 is sealably slidable within bore 113 along with a master rod 117 that extends from master cylinder body 109 and is sealably slidable with respect to the rod end of cylinder body 109. The distal end of master rod 117 is connected to the elongate common pin 51a in the same manner as rods 37 of drive cylinders 29a, 29b, as best shown in FIGS. 6 and 8, so that the master rod 117 and master piston 115 move with the drive rods 37 and drive pistons 35 of drive cylinders 29a, 29b for purposes as will appear. Master cylinder 107 has a base end port 119 and a rod end port 121.

Figure 20:
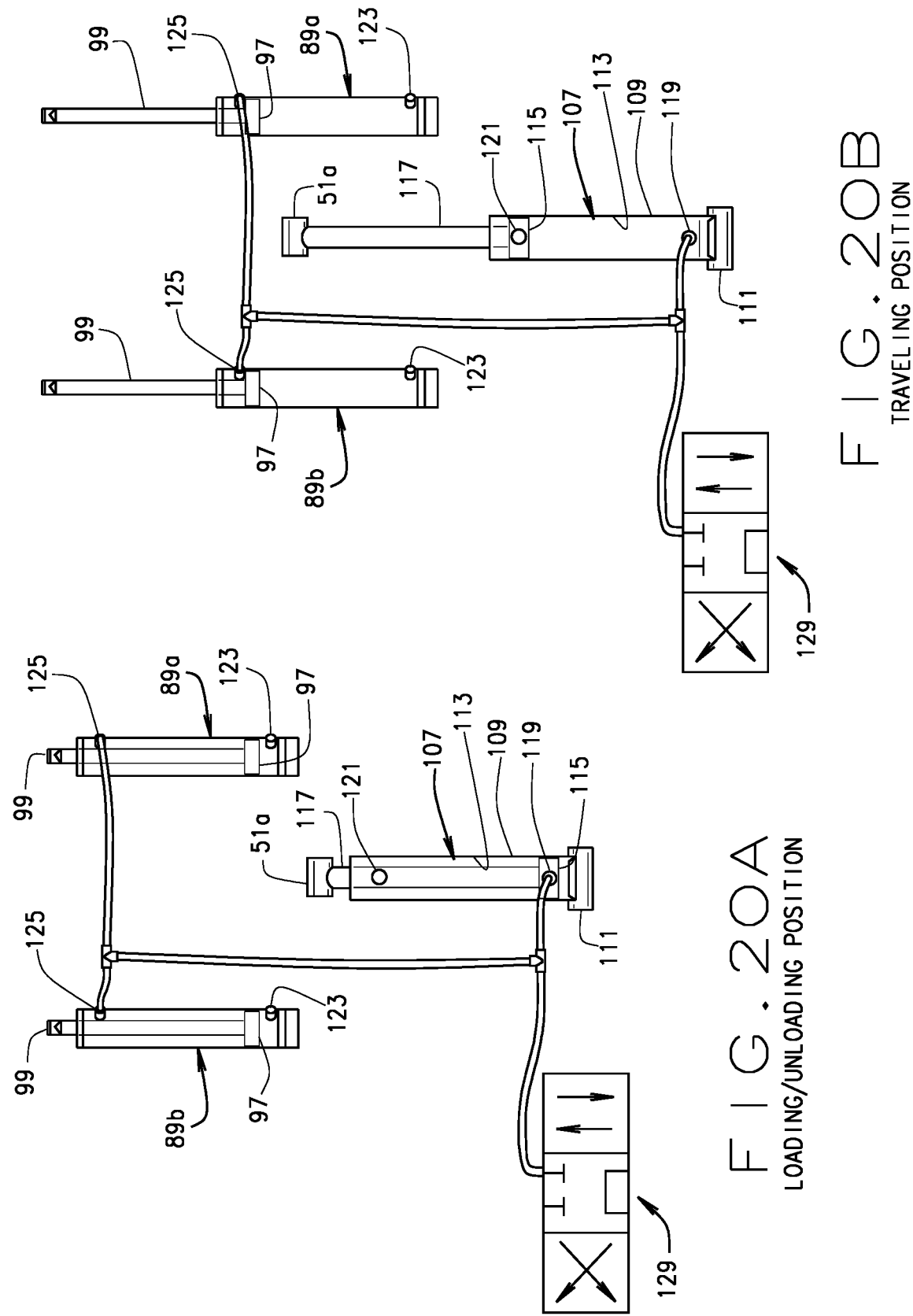
FIG. 20A is a schematic diagram of a hydraulic self-leveling system that self-levels the load as the load is moved between its loading/unloading and traveling positions, illustrating how a master cylinder is mounted to the lift frame is movable with the drive cylinders shown in FIGS. 1-9 and how hydraulic fluid is transferred between the base end of the master cylinder to the rod ends of a pair of leveling cylinders to maintain a substantially constant tension on the leveling chain, as shown in FIG. 13, regardless of the weight of the load so as to resist the torque imposed on the cross member by the weight of the load supported on the forks so as to maintain the load in a substantially level position.
FIG. 20B is a another view of the hydraulic self-leveling system shown in FIG. 20A as the load is moved from its traveling position toward its loading/unloading position.

As best shown in FIGS. 20A and 20B and in FIG. 35, each slave cylinder 89a, 89b has a base end port 123 and a rod end port 125, where the rod end ports 125 are hydraulically connected to the base end port 119 of master cylinder 107. Ports 123 of the slave cylinders and port 121 of master cylinder are open to the atmosphere. A manually (or electrically) operated make-up valve 129, such as a Series 20 directional control valve commercially available from Prince Manufacturing Company, http://www.princehyd.com/, is hydraulically connected to the rod end ports 125 of the slave cylinders and to the base end port 119 of the master cylinder 107 so that hydraulic fluid may be selectively admitted into or exhausted from the self-leveling system 27 to as to selectively change the tilt of the forks 15a, 15b.

Figure 10:
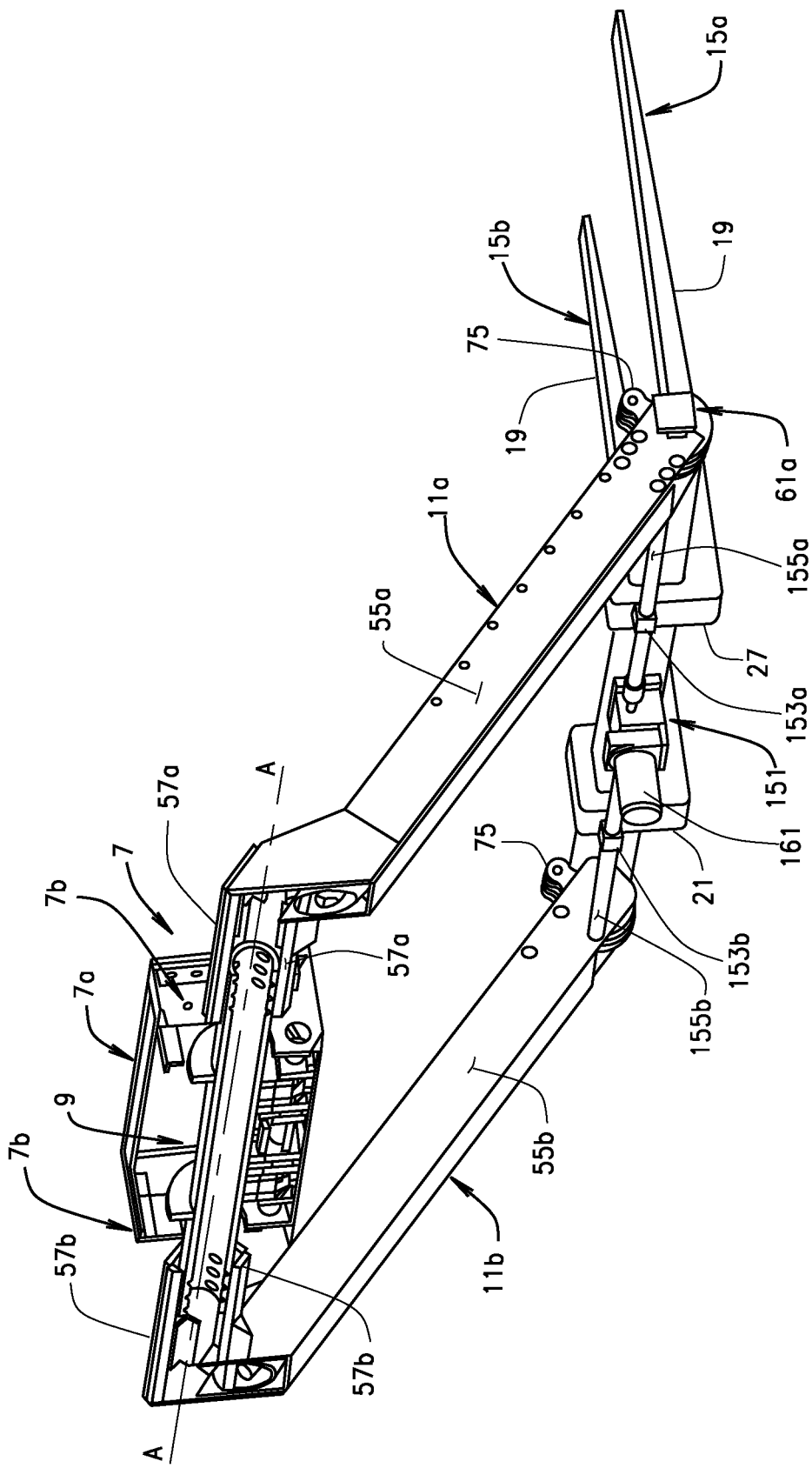
FIG. 10 is a perspective view of a pair of lifting arms of the lifting apparatus driven by the lifting drive with a cross member rotatably supported between the distal ends of the arms where the cross member has one or more lifting members or forks slidably mounted thereof for supporting the load as the load is moved between its loading/unloading and traveling positions.

As previously noted, the weight of the load 5, as it is supported on forks 15a, 15b, exerts a torque on cross member 13 that tends to rotate the forks downwardly, as shown in FIGS. 2 and 10. Because the cross member 13 is journalled relative to arms 11a, 11b by bearings 83, 85, this torque must be resisted by chain 77 connected to lugs 75 in order to maintain the forks and the load in a substantially level position. As will be understood by those skilled in the art, as the side arms 11a, 11b move from the loading/unloading position toward the traveling position, the cross member 13 must rotate relative to the side arms in order for the lifting forks to be maintained in their level position. Thus, the self-leveling means must apply sufficient torque to the cross member to resist the weight of the load on the forks and it must allow the cross member to rotate relative to the side arms. The cross member torque thus applies a tension load to chain 77, which in turn tends to pull rods 99 out of leveling cylinders 89a, 89b. As best illustrated in FIGS. 2, 3, 6, 7, 13 and 20A, with the lift in its loading/unloading position, the drive rods 37 of drive cylinders 29a, 29b, the rods 99 of leveling cylinders 89a, 89b, and the master rod 117 are in their retracted positions. Upon actuating drive cylinders 29a, 29b to move the lift from its loading/unloading position toward its traveling position, drive rods 37 are extended by admitting hydraulic fluid under pressure into the base end ports 38b of the drive cylinders. Because the end of master rod 117 moves with pin 51a, the master rod 117 is also extended by extension of the drive rods 37, which causes master piston 115 to move away from its base end toward its rod end. As mentioned, as the load 5 is lifted from the ground, the weight of the load exerts a torque on cross member 13 that tends to pull the leveling rods 99 of the leveling cylinders 89a, 89b toward the rod ends of the leveling cylinders via leveling chain 77 such that hydraulic fluid in the rod ends of the leveling cylinders is pressurized within the leveling cylinders by the torque exerted on the cross member 13 by the weight of the load 5. As shown in FIG. 20A, the rod end ports 125 of the traveling cylinders 89a, 89b are connected to the base end port 119 of master cylinder 107 such that as the master rod is extended by extension of the drive cylinders 29a, 29b, hydraulic fluid from the leveling cylinders flows under pressure to the base end port 119 of master cylinder 107. Because the rod end port 121 of master cylinder 107 and the base end ports 123 are open to the atmosphere, air will enter the base end ports 123 of the leveling cylinders 89a, 89b and the rod end port 121 of the master cylinder 107. It will be appreciated that because the cross-sectional area of the base end of master cylinder 107 is about twice the cross sectional area of the rod end of each of the leveling cylinders less the diameter of rods 99, and because the strokes of the leveling cylinders 89a, 89b and the stroke of the master cylinder 107 are about equal, movement of the side arms 11a, 11b between the loading/unloading and traveling positions will cause the leveling cylinders to rotate cross member 13 through a sufficient angle (e.g., about 240°, plus or minus 30°) such that the lifting forks 15a, 15b are maintained in a substantially level position.

As best shown in FIGS. 1, 4, 9, 20B and 35, with the lift 1 and the load 5 in the traveling position, as the lift and the load are moved toward the loading/unloading position, drive cylinders 29a, 29b are actuated so as to retract their rods 37 by admitting hydraulic fluid under pressure from valve 217 to the rod end ports 38a of drive cylinders 27a, 27b, as shown in FIG. 35. Again, because the end of master rod 117 is connected to the ends of the drive cylinder rods 37 by common pin 51a, retraction of the drive cylinder rods of the drive cylinders causes the rod 117 of master cylinder 107 to be retracted. As shown in FIGS. 20B and 35, piston 115 within master cylinder 107 moves with rod 117 toward the base end of the master cylinder so as to thus force hydraulic fluid within the rod end of master cylinder 107 to be exhausted from the base end port 119 of the master cylinder and to be forced under pressure into the rod end ports 125 of traveling cylinders 89a, 89b, which in turn, forcibly retracts rods 99. Because the ends of rods 99 are connected via leveling chain 77 to lugs 75 on cross member 13, the retraction of rods 99 allows the cross member to rotate relative to side arms 11a, 11b thus substantially maintaining the forks 15a, 15b and the load 5 supported thereby in a substantially level position as the lift moves from its traveling position to its loading/unloading position. It will be understood that the torque applied to the cross member 13 depends on the weight of load 5. It will be further understood that tension applied to claim 7 is dependent on the weight of the load such that the load is self-leveled regardless of its weight. It will also be understood that the make-up valve 129 shown in FIGS. 20A, 20B and 35 may be manually operated so that the tilt of the forks 15a, 15b can be manually adjusted.

Referring now to FIGS. 14 and 15, an alternate embodiment of the self-leveling means is indicated in its entirety at 27' shown. In this embodiment, the leveling chain 77' extends from lugs 75' to a sprocket 131 affixed to shaft 9 such that the sprocket rotates with the shaft 9 as the load is moved between its loading/unloading and its traveling positions. As best shown in FIG. 3, as the drive cylinder rods 37 are extended, the shaft 9 moves clockwise. The diameter of sprockets 131 and the radial distance of lugs 75' from the axis of rotation of cross member 13 are such that as the lift is moved between its loading/unloading and traveling positions, the chain 77' will allow the chain to remain taut and will wrap or unwarp from around sprocket 131 to as to allow the cross member 13 to rotate with respect to the distal ends of side arms 11a, 11b and so as to maintain the forks 15a, 15b and load 5 in a substantially level position.

It will also be recognized by those of ordinary skill in the art that a mechanical linkage can be employed to self-level the load as it is moved between its loading/unloading and traveling positions. One such self-leveling linkage arrangement is described in U.S. Pat. No. 5,553,856, which is herein incorporated by reference in its entirety.

Referring now to FIGS. 1, 2, 10 and 19, a drive for moving forks 15a, 15b inwardly and outwardly along cross member 13 is shown in its entirety at 151. This drive comprises a frame 153 secured to cross member 13 at the center of the cross member. A pair of screws 155a, 155b is journalled relative to the frame 153. Each screw has a bevel gear 157 on its inner end, which are driven by a bevel drive gear 159 mounted on the drive shaft of an electric motor 161. Each of the screws 155a, 155b are threaded into a threaded socket 163a, 163b mounted, respectively, to forks 15a, 15b, as best shown in FIGS. 1 and 2. Screws 155a, 155b are threaded in opposite directions (i.e., one has right-hand threads and the other has left-hand threads) such that with the forks unloaded (i.e., not supporting the weight of the load 5), energization of motor 161 in one direction will cause the screws to simultaneously move the forks inwardly and energization of the motor in the opposite direction will case the forks to move outwardly on cross member 13. In this manner, the spacing of the forks on cross member 13 may be readily adjusted.

Figure 21:
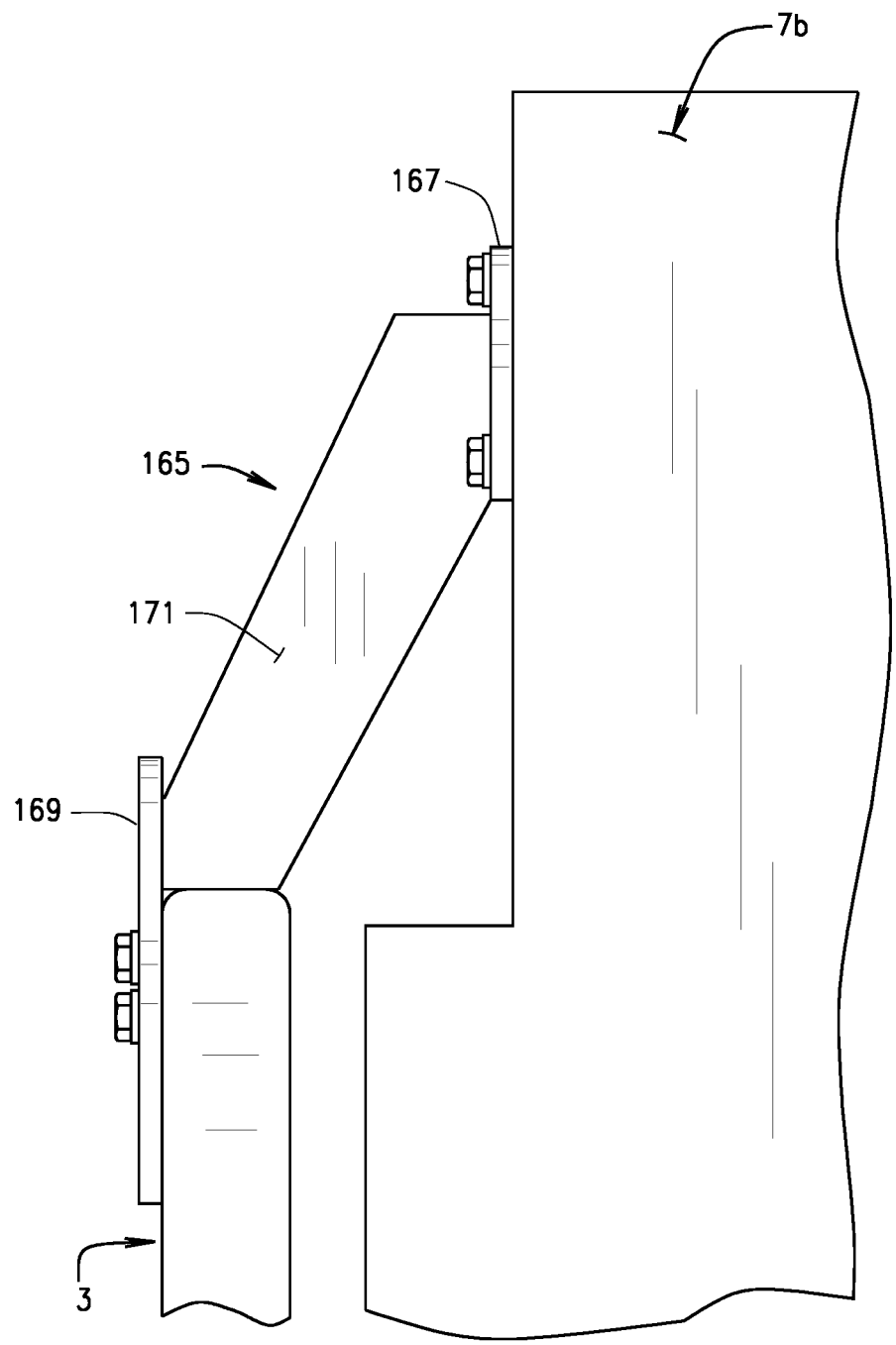
FIG. 21 is a side elevational view illustrating an offset bracket for attaching the lift frame to the frame of a truck or other vehicle.
Figure 22:
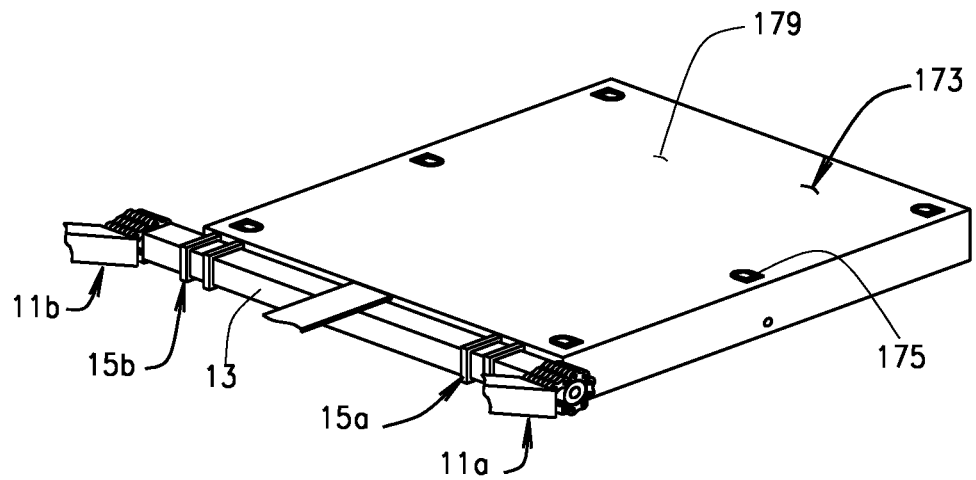
FIG. 22 is a perspective view of a bed platform supported on the forks of the lift on which a load may be placed and secured (by means of straps not illustrated) to the bed platform.

As previously mentioned, lift frame 7 is adapted to be mounted to the frame 3 of the vehicle on which the lifting apparatus 1 is to be mounted. However, the spacing of the vehicle frame rail members 3 of vehicles of different manufacturers may be spaced from one another at somewhat different amounts. As shown in FIG. 21, an offset bracket 165 is provided to account for the different vehicle frame rail spacing. Bracket 165 has an upper vertical foot 167 and a lower vertical foot 169 with an offset frame 171 therebetween. The upper and lower vertical feet are adapted to be bolted to the outer face of the channels of the longitudinal lift frame members 7b and the outer faces of the vehicle frame 3. In this manner, by supplying a set of brackets 165 of the proper offset for the brand of vehicle on which lift 1 is to be mounted, the brackets will allow the lift frame 7 to be readily be secured to vehicles of different manufacturers.

Figure 23:
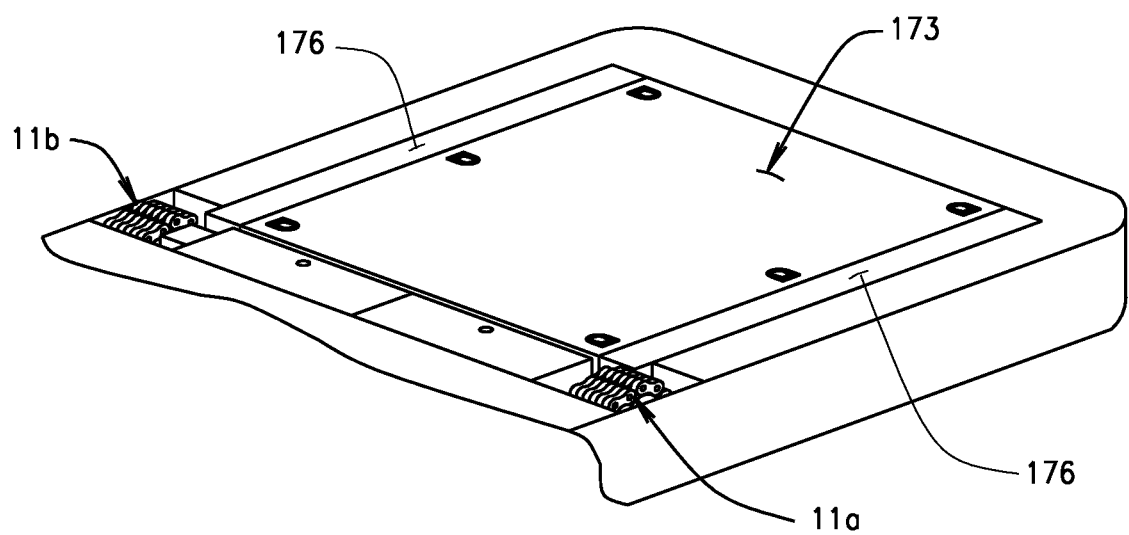
FIG. 23 is a perspective view of the bed platform in its traveling position in which it is releasably secured to the lift frame for supporting the load and for securing the bed platform when the load is in its traveling position.

Referring to FIGS. 22-31, a bed platform, as generally indicated at 173, may be placed on top of forks 15a, 15b. The load 5 may be placed on the upper surface of the bed platform. The bed platform has a series of securement rings 175 to which the load (e.g., a stack or a pallet load of roofing shingles or the like) may be lashed with suitable straps or the like (not shown). In this manner, the load and the load platform may be handled as a unit. Then, the bed platform 173 and the load are lifted by the lift 1 from the loading/unloading position L/UL and moved to the traveling position T, as shown in FIG. 23, in which the upper surface of the bed platform and the structure surrounding the bed platform for a coplanar surface, where so-called wings 176 are hingedly connected to the lift structure on the longitudinal sides of the lift when the lift and the load platform are in the traveling position. Once the load platform is in place on top of the lift frame 7, as shown in FIG. 23, the wings 176 may be folded down to close any gap between the load platform and the surrounding structure.

Figure 32:
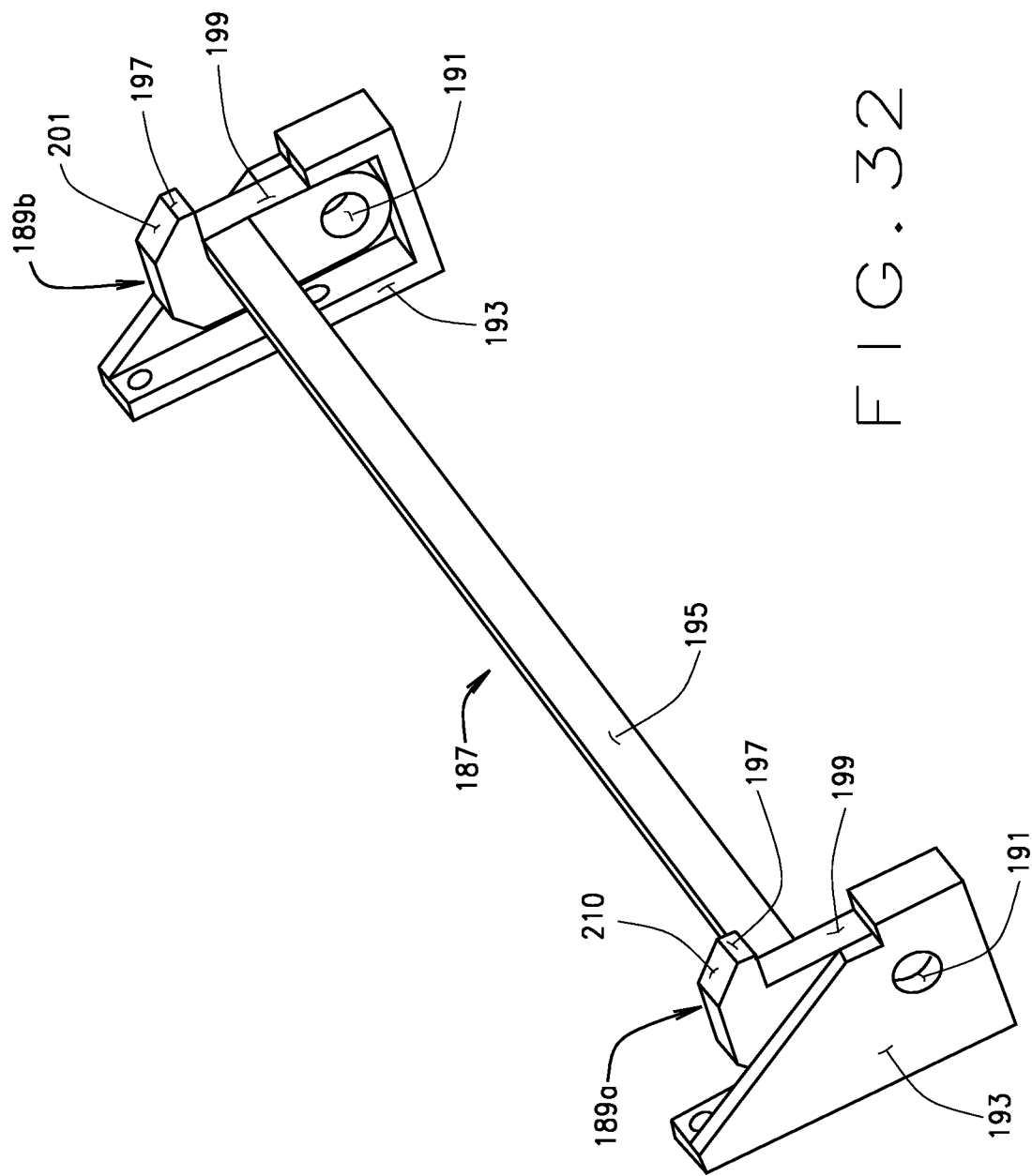
FIG. 32 is a perspective view of a latch assembly configured to be secured to the longitudinal lift frame side members for releasably locking the bed platform and the load secured thereto to the lift frame when the load and the bed platform are moved to their traveling position.
Figure 33:
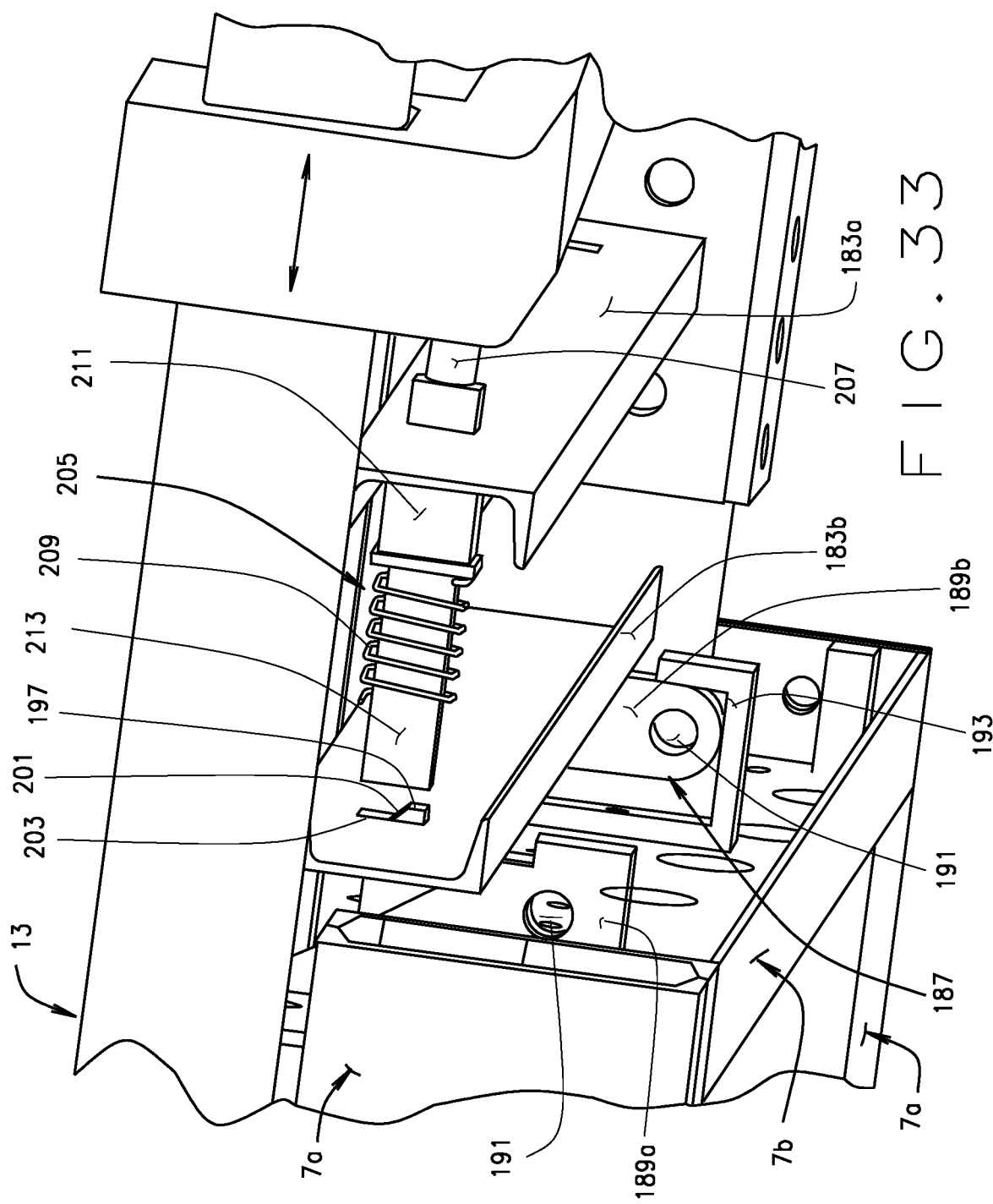
FIG. 33 is a bottom perspective view of the bed platform latched to the lift frame by means of the latch assemblies shown in FIG. 32, and further illustrating a latch release mechanism operable by moving the forks inwardly from their stowed position, as shown in FIG. 29, by operating the drive (shown in FIG. 19) for moving the forks along the cross member with a portion of the fork engaging a pin spring biased toward its respective fork so that upon the fork engaging the end of the pin, the pin is moved against the bias of a spring from its extended position, as shown in FIG. 34, to engage the nose of a latch member to release the bed platform from the lift frame.
Figure 34:
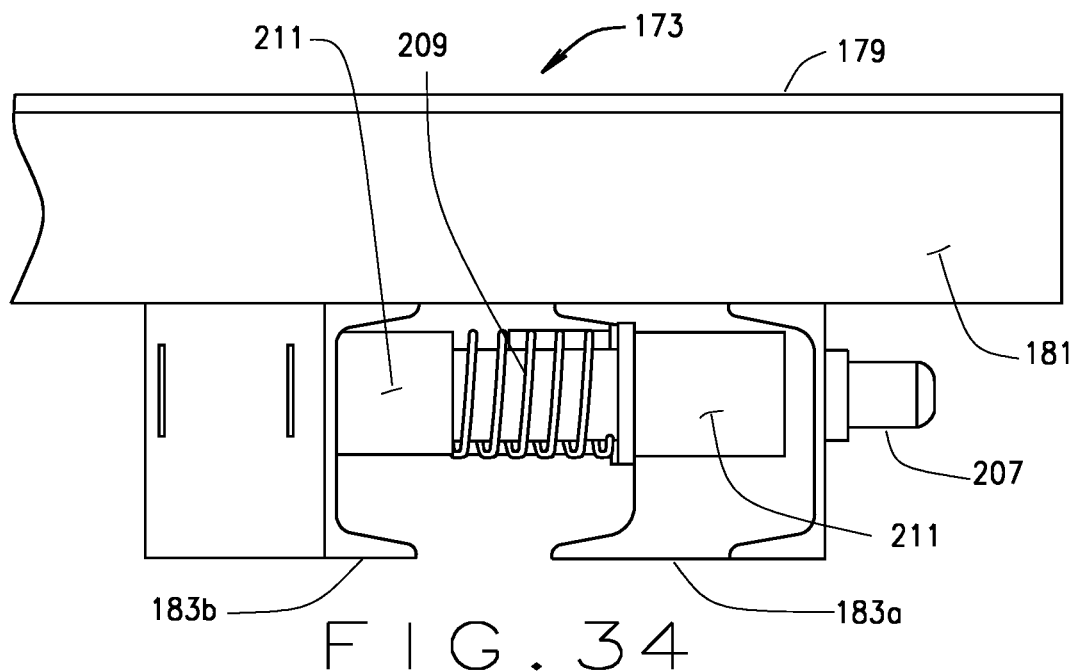
FIG. 34 is an end elevational view of the spring biased pin shown in FIG. 33 in its extended position as it is mounted to the bottom of the bed platform.

The bed platform 173, when in the traveling position as shown in FIGS. 24-29 and 33, is releasably secured to the lift frame 7 by a latch assembly, as best shown in FIGS. 32-34. With the lift 1 in its traveling position T and with the load platform resting on the lift frame 7, the weight of the load is supported by the lift frame and the forks 15a, 15b are below the level of the lift platform so that the weight of the load is not borne by the forks because the weight of the load is supported by the lift frame 7 and not the forks. By transferring the weight of the load from the forks to the lift frame, dynamic loads, as may be occasioned by the vehicle hitting a bump or the like while the load is being transported, will not overload the forks or the side arms 11a, 11b or the lift drive 25.

Figure 28:
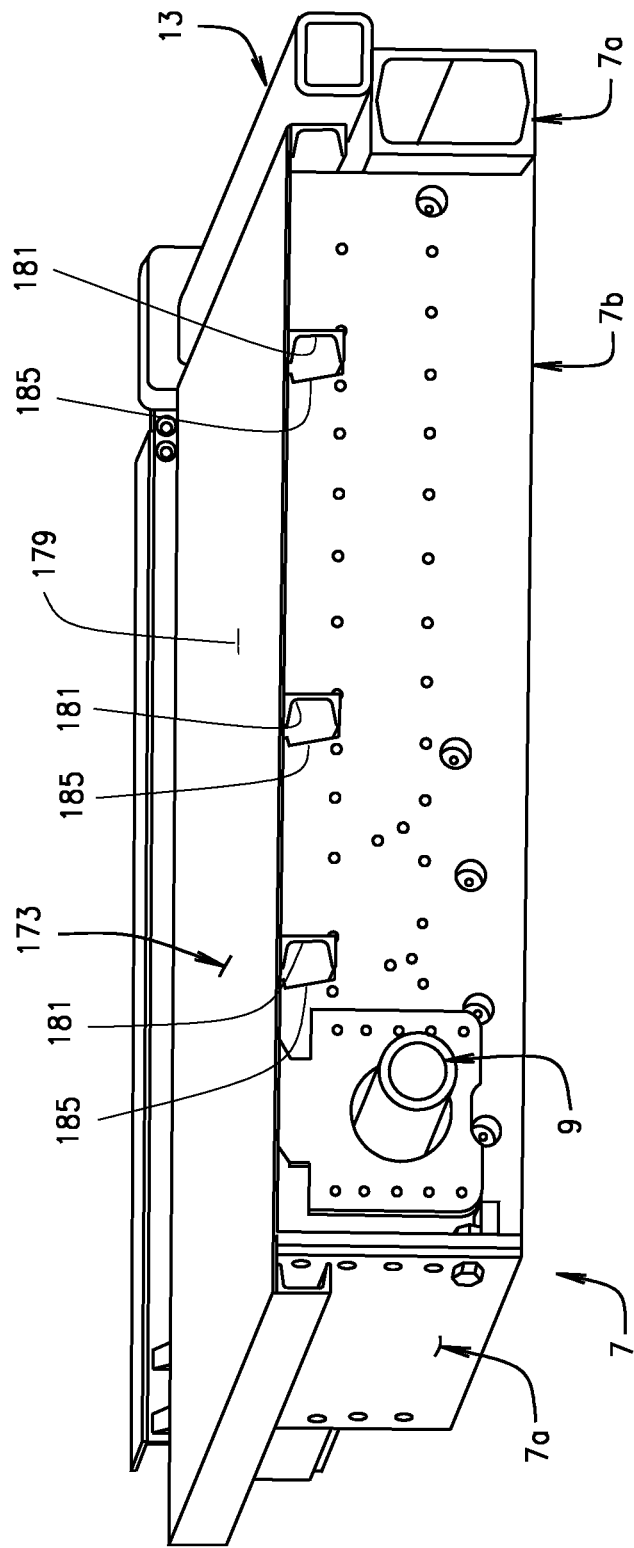
FIG. 28 is a longitudinal cross sectional view of the lift frame with the bed platform latched to the lift frame.
Figure 29:
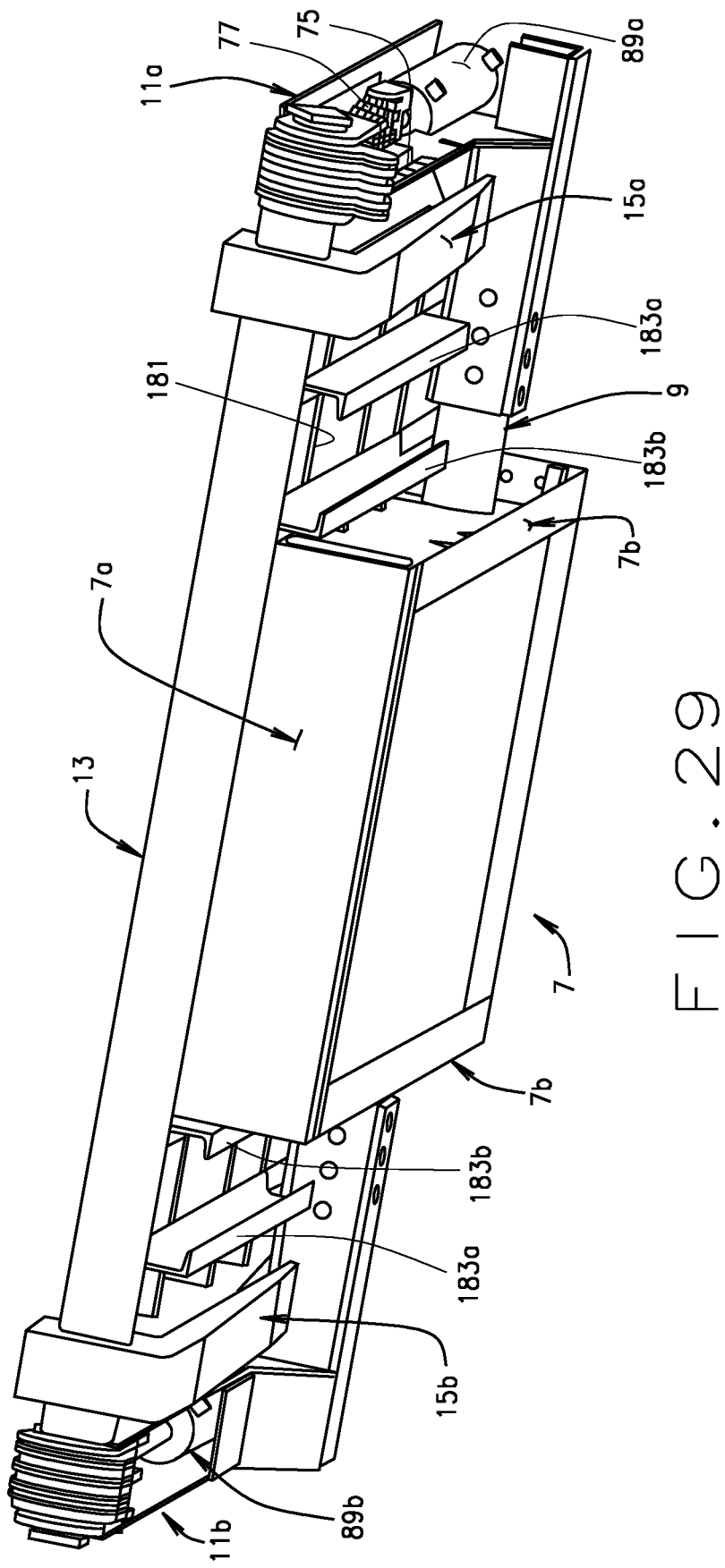
FIG. 29 is a bottom rear perspective view of the lift in its traveling position with the bed platform installed on the lift frame and illustrating the forks in a stowed position below the level of the surface of the bed platform on which the load preferably rests as the load is transported.
Figure 30:
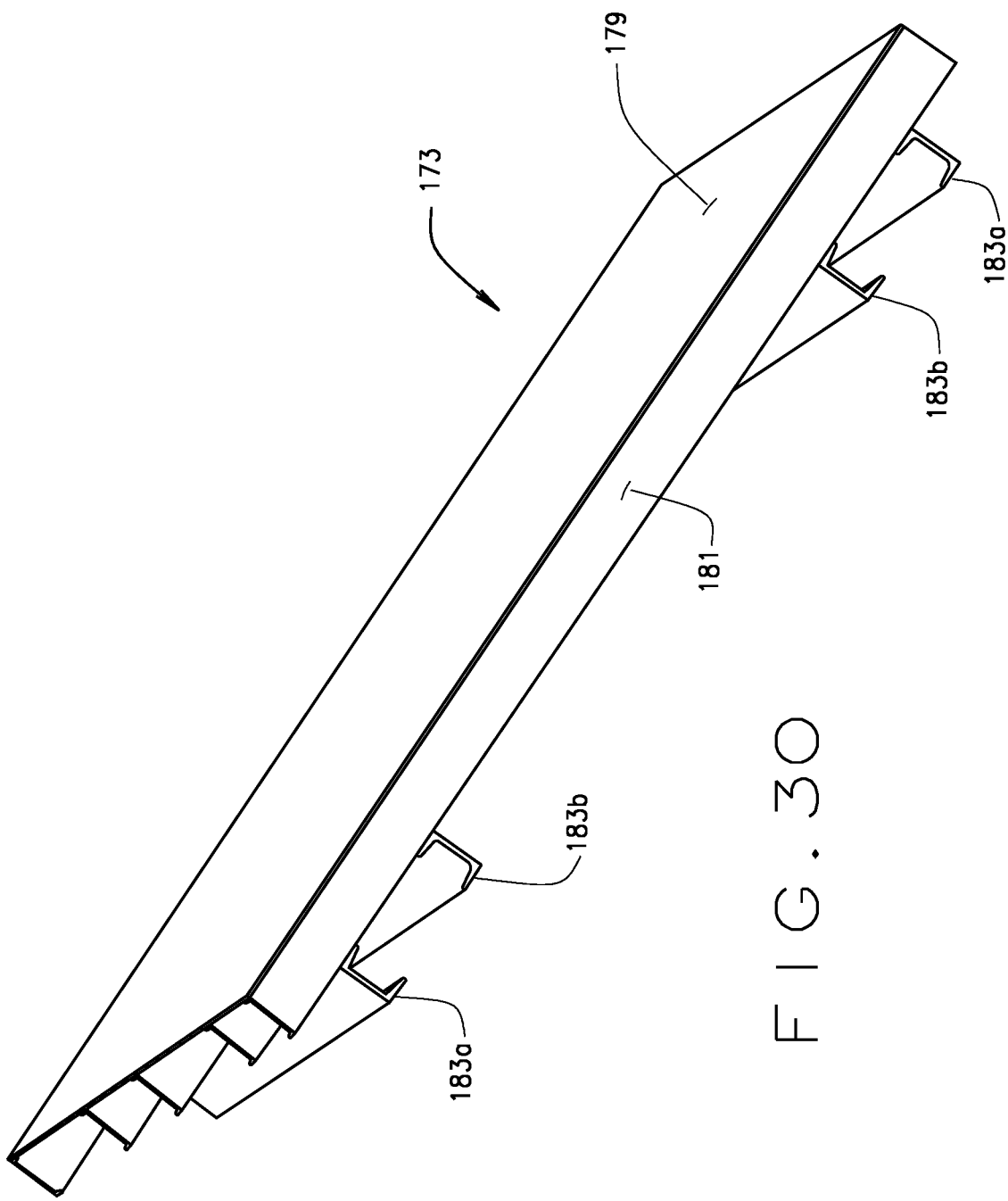
FIG. 30 is a top perspective view of the bed platform removed from the lift frame.
Figure 31:
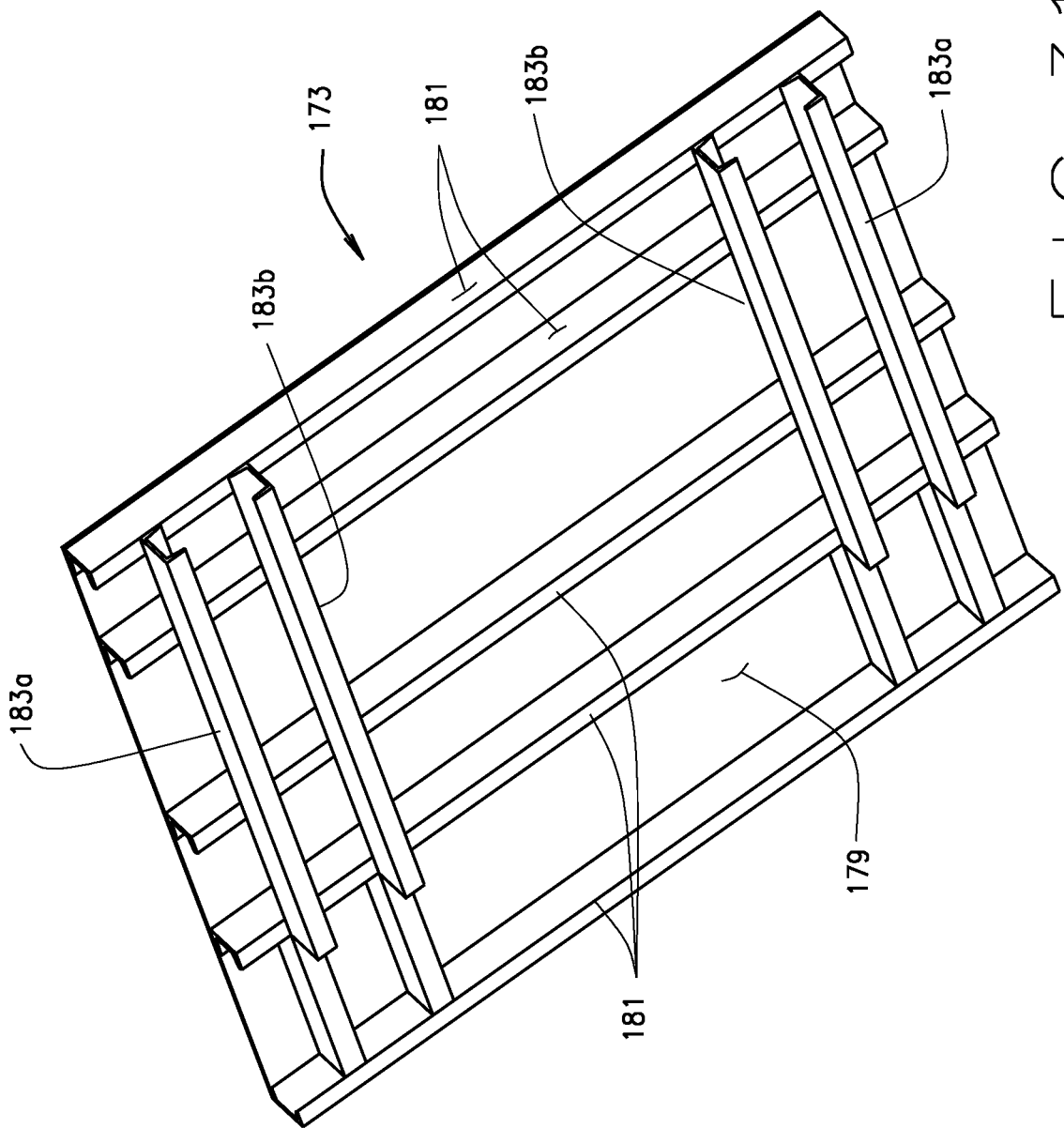
FIG. 31 is a bottom perspective view of the bed platform removed from the lift frame.

As shown in FIGS. 24-31, bed platform 173 has an upper bed plate 179 with a plurality of spaced bed plate channels 181 secured (e.g., preferably welded) to the bottom of the bed plate and extending widthwise (laterally) of the bed plate. As indicated at 183a, 183b, two pairs of spaced channels are secured (e.g., welded) to the bottoms of the bed plate channels 181 with each pair of channels 183a, 183b being spaced on the outside of the longitudinal frame members 7b when the bed platform is in its traveling position. As shown in FIGS. 27 and 28, pockets 185 are provided in the upper reaches of the longitudinal frame members 7b of lift frame 7 to receive bed plate channels 181 so that the bottom of bed plate 179 will rest directly on top of the lift frame 7 when the load is in its traveling position T.

As shown in FIGS. 32-34, a latch assembly, as generally indicated at 187, is secured to the outside of each of the longitudinal lift frame members 7b so as to automatically latch the platform bed 173 (and the load 3 lashed thereto) to the lift frame 7 as the lift moves into its traveling position. In a manner as will be described, the latch assembly 187 may be readily unlatched by an operator so that the load may be moved from the traveling position to the loading/unloading position to unload the load. Each latch assembly 187 has two spaced apart C-shaped latch members 189a, 189b that are pivotally mounted, as indicated at 191, to a latch frame 193, where the latch members are spring biased toward the position shown in FIGS. 32 and 33. Latch frames 193 are secured (preferably bolted) to the web of its respective lift frame member 7b. A bar 195 joins the latch members so that they will pivot substantially in unison. Each of the latch members has a nose 197 that extends out beyond the throat 199 of the C-shaped latch member and a sloped cam surface 201 for purposes as will appear.

As shown in FIG. 33, when the lift 1 is in its traveling position, bed platform 173 is latched to frame 7. The noses 197 of the C-shaped latch members 189a, 189b project through corresponding openings 203 in the webs of the innermost channel 183b so as to releasably latch the bed platform 173 to the lift frame 7, which in turn is securely fastened to the vehicle frame 3. As the bed platform with the load 5 thereon moves downwardly into its traveling position T, the lower, innermost edge of the inner channel 183b engages the sloped cam surface 201 on each of the C-shaped latch members 189a, 189b and thus forcing the latch members back against the bias of a spring (not shown). When the noses 197 of each of the C-shaped latch members move into register with a respective opening 203 in the web of channel 183b, each latch member springs into its position, as shown in FIG. 33, in which the nose 197 extends through its opening 203 and engages the bottom of opening 203 to securely latch the bed platform 173 and the load 5 to the lift frame 7. This is all done automatically without help from the operator as the load platform moves fully into its traveling position.

Figure 19:
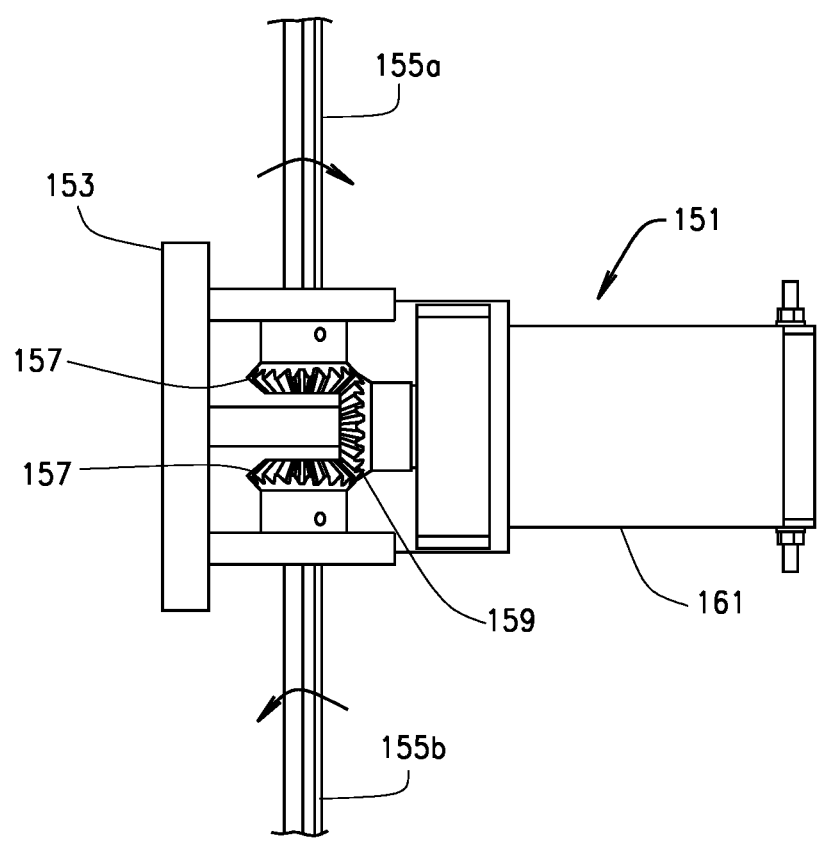
FIG. 19 is a top plan view of a drive for laterally moving or adjusting the load lifting members or forks toward and away from one another on the cross member.

To unlatch the bed platform 173 from the lift frame 7, an unlatch assembly, as generally indicated at 205 and as best shown in FIG. 33, is selectively operated by an operator desiring to unlatch the load platform from the lift frame 7 and to allow the load platform and the load to move from the traveling position toward the loading/unloading position. With the load platform and the lift in the traveling position, the load platform is unlatched by effecting inward movement of the forks 15a, 15b along cross member 13 by energizing electric motor 161, as shown in FIG. 19. It will be appreciated that with the load platform 173 resting on lift frame 7, the weight of load 5 is supported on the lift frame such that the forks do not support the weight of the load and thus the forks may be readily moved along the cross member by the drive 151 shown in FIG. 19. As further shown in FIG. 33, the unlatch assembly 205 comprises a pair of pins 207, one for each latch member 189a, 189b, that project outwardly beyond the web of the outer channel 183a. Each of the pins 207 is biased outwardly by a spring 209 and is slidable in bushings 211. A bar 213 is provided on the inner end of pin 207 and is positioned to engage the nose 197 of its respective C-shaped latch member 189a or 189b that projects through opening 203 as the pin 207 moves inwardly. A projection (not shown) may extend beyond the inner end of bar 213 to engage the nose 197 of the latch members that extends through opening 203 to insure that the nose is moved clear of opening to fully unlatch the lift platform from lift frame 7. With the latch members moved clear of their openings 203, upon actuation of the drive cylinders 29a, 29b to move the lift 1 from its traveling position toward its loading/unloading position, the forks 15a, 15b will engage the underside of the load platform and will lift the load platform and the load clear of the lift frame and move them to the loading/unloading position.

Referring now to FIG. 35, a diagram for the hydraulic system used to power the lift 1 and the self-leveling system 27a is shown. The system includes a hydraulic fluid reservoir 213. A hydraulic pump 215, preferably driven by the motor of the vehicle upon which lift 1 is mounted, draws fluid from the reservoir and supplies it under pressure to a manually (or electrically) operated hydraulic control valve 217, such as a Series 20 directional control valve similar to valve 129 heretofore described. As shown, pump 213 has a pulley wheel 217, which in turn, is belt driven by the vehicle's engine. Control valve 217 is manually operated to effect movement of the lift between its loading/unloading position and its traveling position by supplying hydraulic fluid under pressure to drive cylinders 29a, 29b. The master cylinder 107 and the leveling cylinders 89a, 89b are shown to be supplied hydraulic fluid under pressure from another hand operated valve 129 to selectively vary the tilt of the forks 15a, 15b.

As various changes could be made in the above constructions without departing from the broad scope of the disclosure, it is intended that all matter contained in the above description or shown in the accompanying drawings shall be interpreted as illustrative and not in a limiting sense.

What is claimed is:

1. A method of moving a load between a loading/unloading position that is not on a vehicle and a traveling position that is on a vehicle, wherein the vehicle has a lift,
the lift having:
a lift frame positioned inside the vehicle and configured to be secured to said vehicle,
a pair of side arms rotatably supported on said lift frame,
a cross member carried by said side arms,
a pair of forks carried by the cross member configured to be placed under said load when said load is in the loading/unloading position at ground level, wherein each of the pair of forks has an end that is coupled to the cross member,
a drive for moving the load carried by said pair of forks from said loading/unloading position and placing said load in the traveling position on the vehicle, said drive being further operable for moving said load from said traveling position and placing said load in the loading/unloading position at ground level,
said method comprising the steps of:
a. With said load in said loading/unloading position, positioning said pair of forks under said load;
b. Actuating said drive to move said load from said loading/unloading position to said traveling position, wherein with the load in said traveling position is displaced from said loading/unloading position and is supported on said vehicle;
c. Maintaining said load in a substantially level position as the load is moved between the loading/unloading and traveling positions;
d. Transferring the weight of the load from said pair of forks to said lift frame when the load is in the traveling position, wherein a top surface of each of the pair of forks is below a top surface of the lift frame when the load is in the traveling position; and
e. Actuating said drive to move the load from said traveling position to said loading/unloading position so that the pair of forks may be removed from beneath said load.

2. The method as set forth in claim 1, further comprising supporting said load on a load platform which is carried by the pair of forks.

3. The method of claim 1, further comprising securing said load to said lift frame when the load is in the traveling position.

4. The method of claim 3, further comprising unsecuring said load from said lift frame prior to moving said load from said traveling position toward said loading/unloading position.

5. The method of claim 3, wherein said step of securing said load to said lift frame comprises latching a load platform to said lift frame as said load is moved into the traveling position.

\* \* \* \* \*